United States Patent [19]

Yamauchi et al.

[11] Patent Number: 5,436,734
[45] Date of Patent: Jul. 25, 1995

[54] IMAGE-EDIT PROCESSING APPARATUS

[75] Inventors: Tomonari Yamauchi; Kazuya Yamada; Taro Terao; Takashi Nagao; Toshiya Yamada, all of Kanagawa, Japan

[73] Assignee: Fuji Xerox Co., Ltd., Tokyo, Japan

[21] Appl. No.: 369,581

[22] Filed: Jan. 6, 1995

Related U.S. Application Data

[63] Continuation of Ser. No. 978,203, Nov. 17, 1992, abandoned.

[30] Foreign Application Priority Data

Nov. 18, 1991 [JP] Japan ................... 3-328339

[51] Int. Cl.⁶ .................. H04N 1/393; H04N 1/407; H04N 1/60
[52] U.S. Cl. ................... 358/448; 358/451; 358/452; 358/455; 358/468; 358/518; 358/530; 358/537
[58] Field of Search ............ 358/452, 451, 468, 448, 358/455, 518, 537, 530, 523; 382/46, 47

[56] References Cited

U.S. PATENT DOCUMENTS 4,750,044 6/1988 Nakajima .................. 358/452

FOREIGN PATENT DOCUMENTS 2-280459 11/1990 Japan .

Primary Examiner—Scott A. Rogers
Attorney, Agent, or Firm—Finnegan, Henderson, Farabow, Garrett & Dunner

[57] ABSTRACT

An image edit processing apparatus for editing digital images, and an image output apparatus for printing out the processed digital image. In the apparatus, image data is read by an image scanner, and such editorial jobs as enlargement/reduction, change of resolution, rotation, composition, and correction of tone or brightness are carried out for the thus read image data by a personal computer or work station or in print service, so that the edit processing is efficiently carried out at high speed.

16 Claims, 21 Drawing Sheets

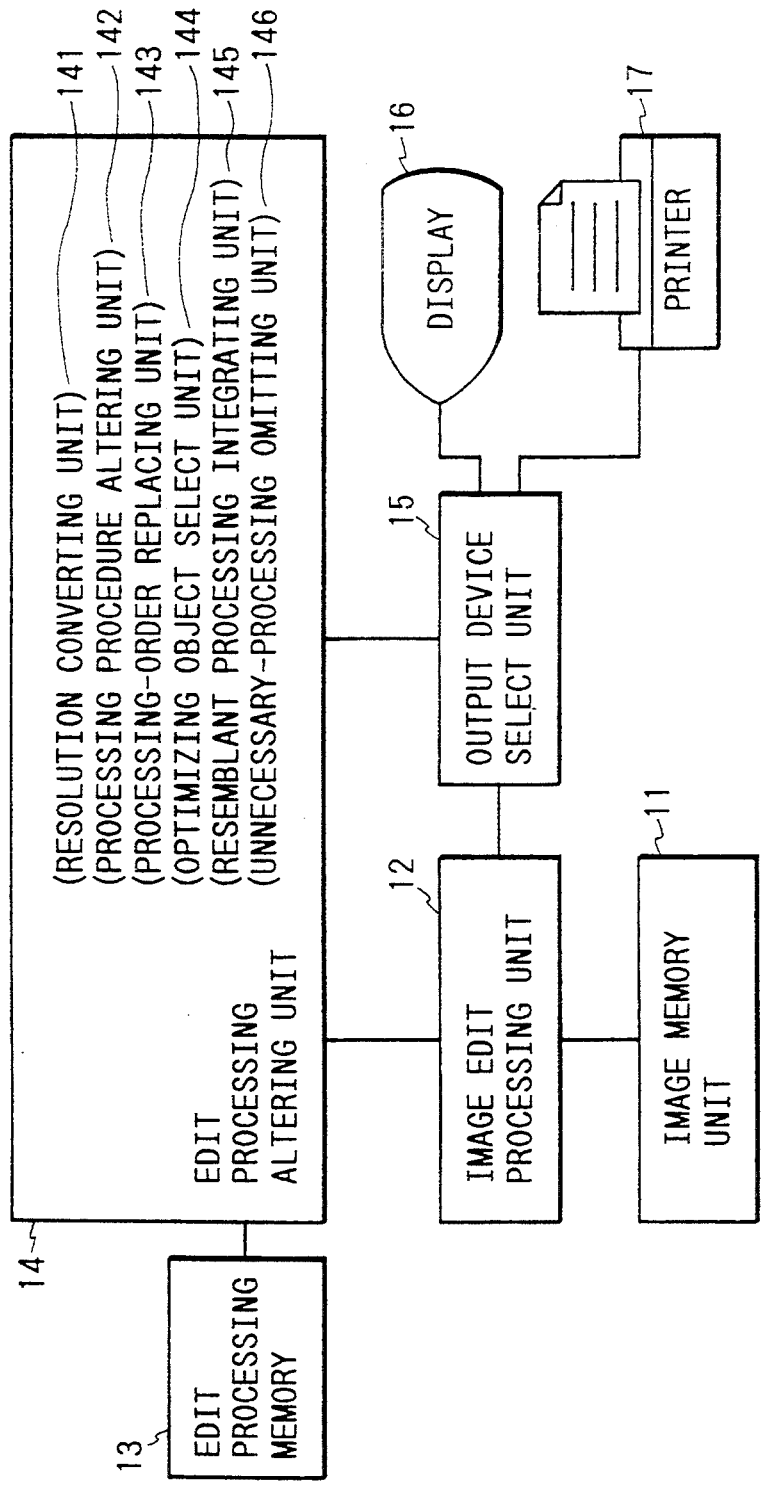

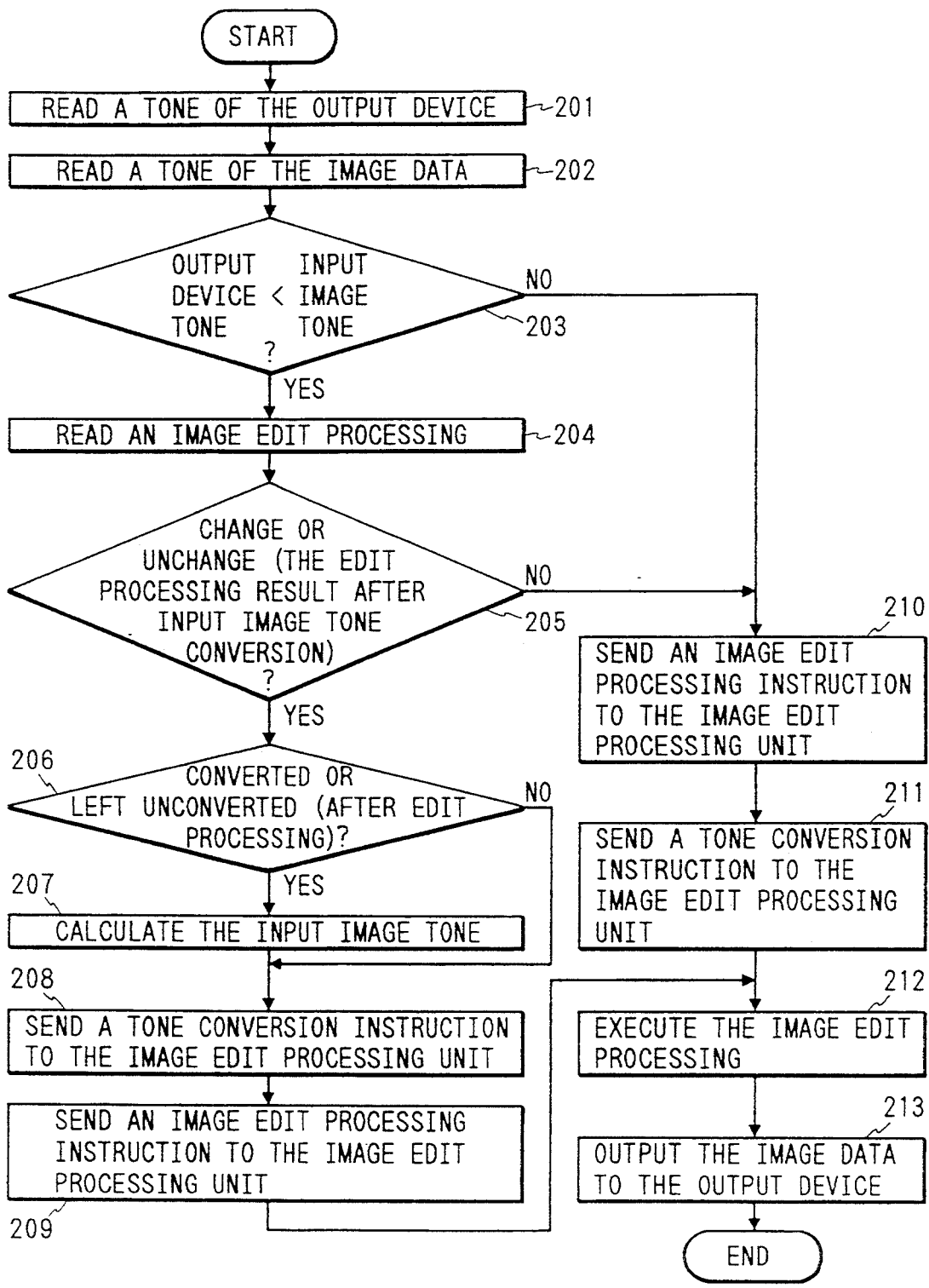

FIG. 3(a)
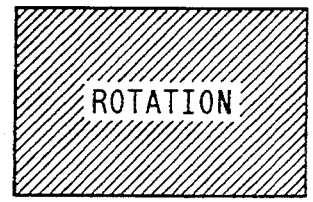
OUTPUT DEVICE OF 256-TONE LEVELS
FIG. 3(b)
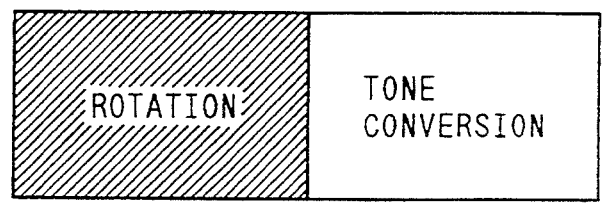
OUTPUT DEVICE OF 1024-TONE LEVELS
FIG. 3(c)
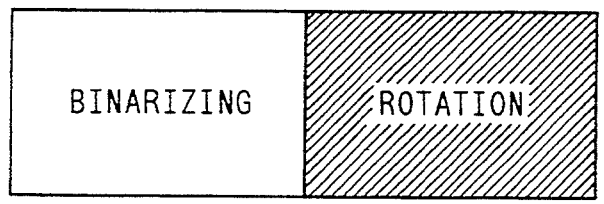
OUTPUT DEVICE OF 2-TONE LEVELS
FIG. 5
|  | MONOCHROME | RGB |
|---|---|---|
| BRIGHTNESS ADJUSTMENT | B/W-YES CONV. → BRIGHTNESS ADJ. | RGB-YES CONV. → BRIGHTNESS ADJ. |
| BINARIZING |  | RGB-B/W CONV. |

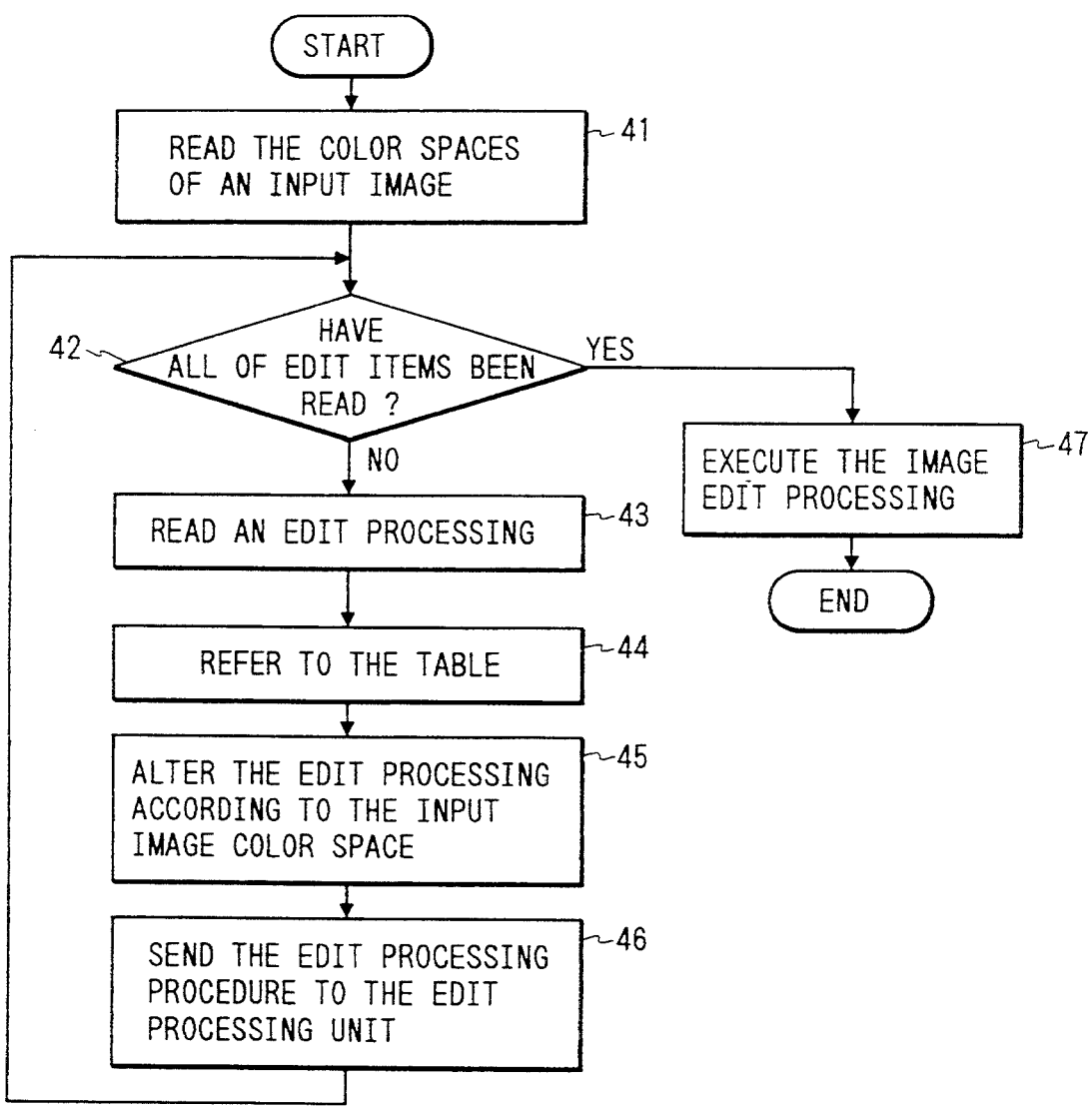

FIG. 7
|  | CHARACTER | GRAPHICS | RASTER |
|---|---|---|---|
| ENLARGEMENT/ REDUCTION | FONT SIZE ALTERING | VECTOR COORDINATE TRANSFORMATION | AFFINE TRANSFORMATION |
| MOVEMENT | FIRST-CHARACTER COORDINATE TRANSFORMATION | VECTOR COORDINATE TRANSFORMATION | AFFINE TRANSFORMATION |
FIG. 9(a)
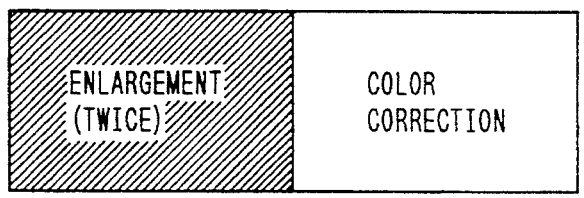
EDIT PROCESSING FOR A PRINTER
FIG. 9(b)
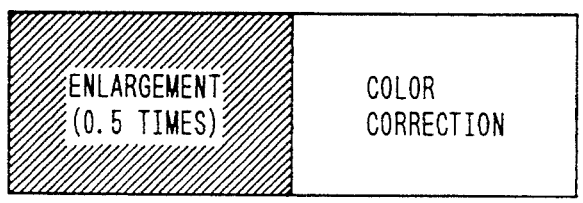
EDIT PROCESSING ALTERED FOR A CRT DISPLAY

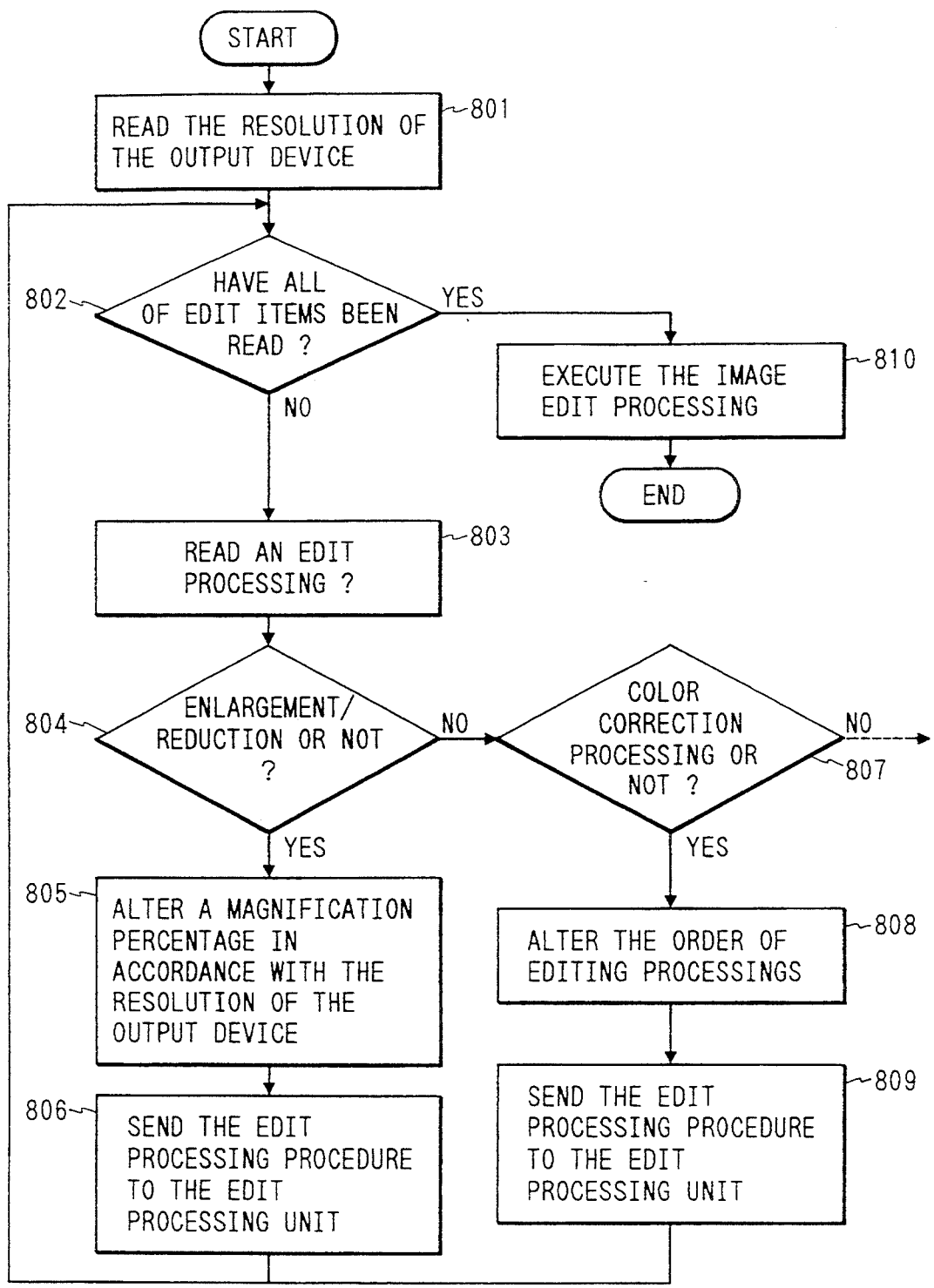

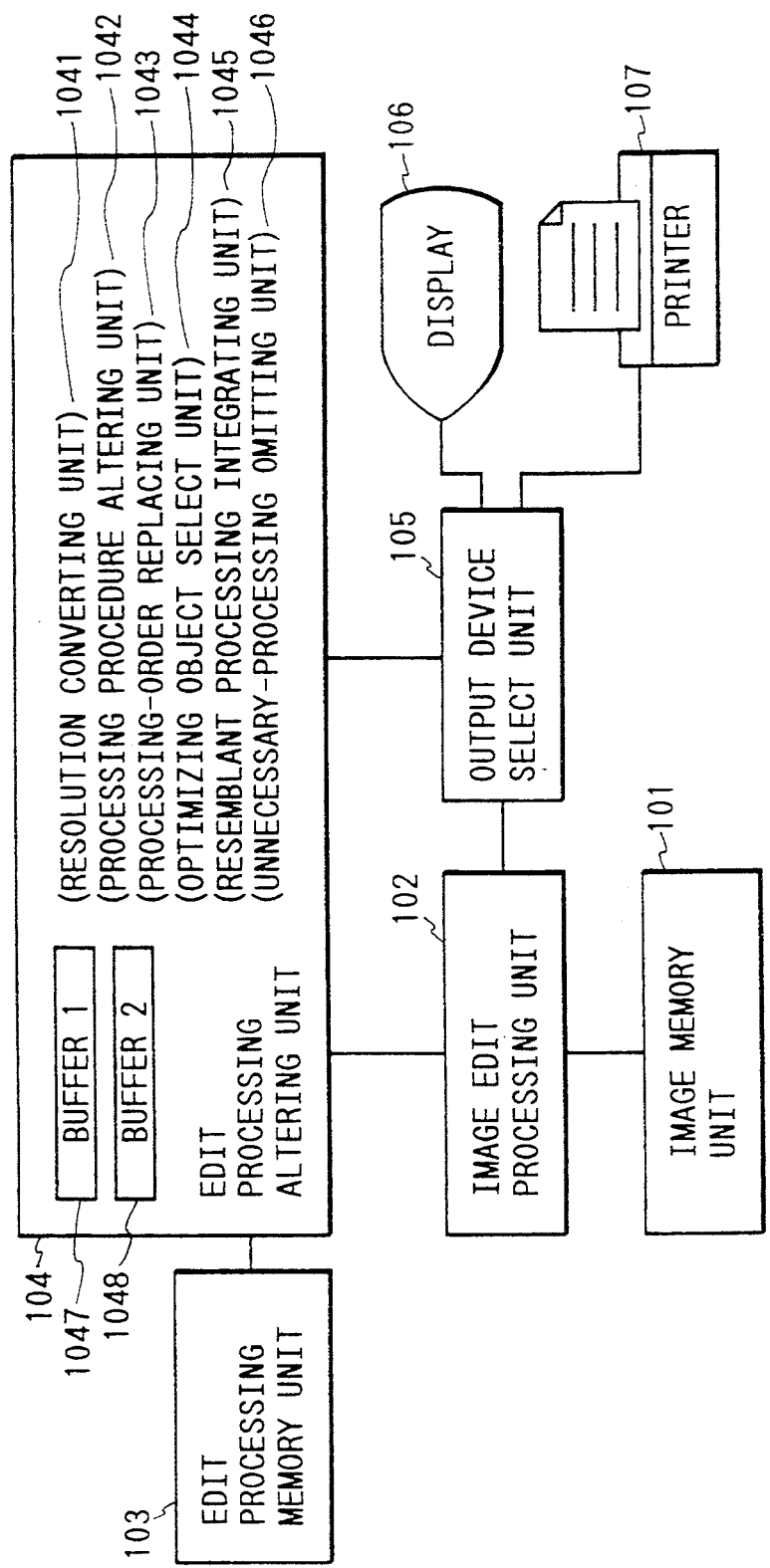

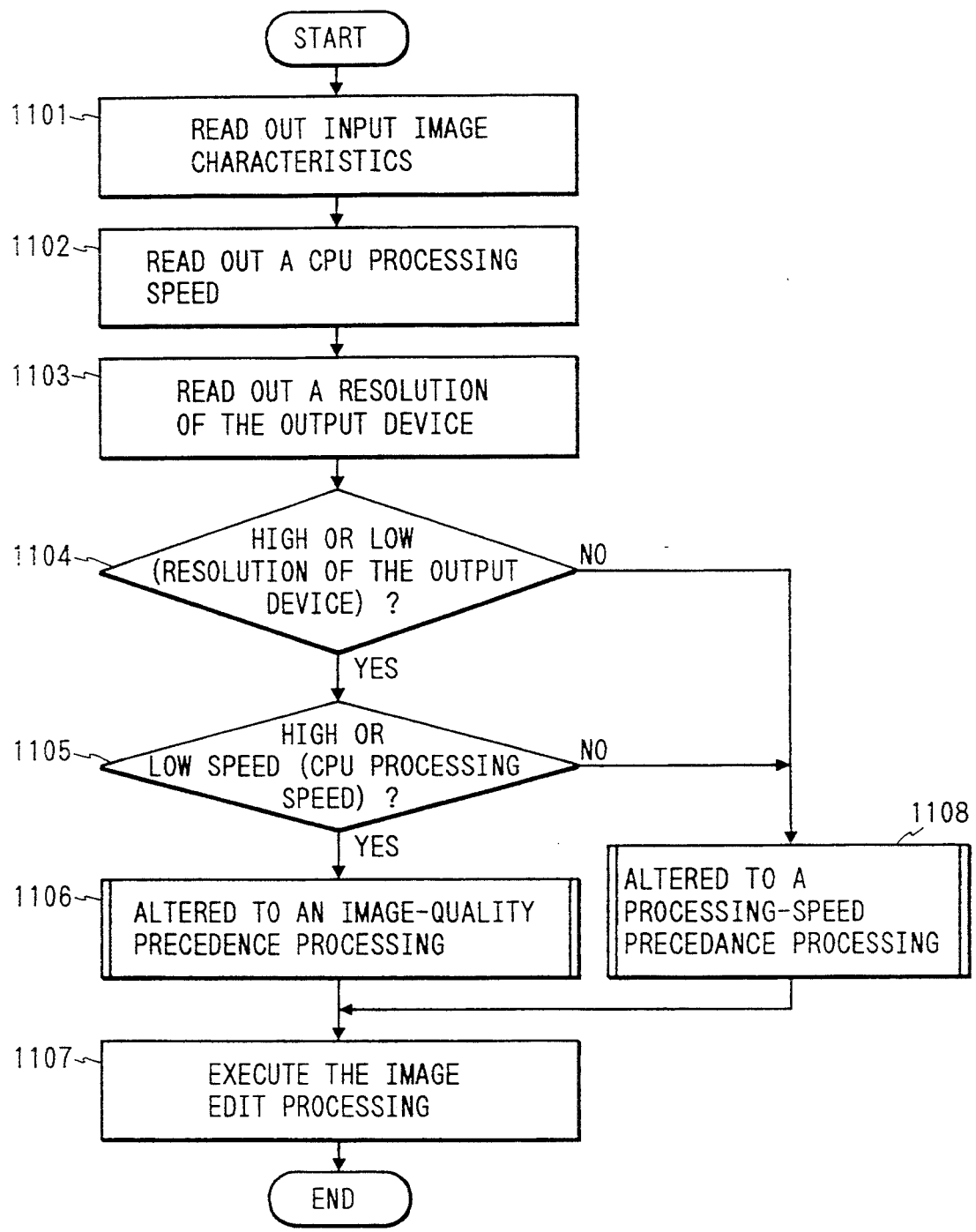

FIG. 14

| PROCESSINGS | TIME | PROCESSINGS | TIME |
|---|---|---|---|
| ENLARGEMENT, COLOR CONV. | LONG | COLOR CONV., ENLARGEMENT | SHORT |
| REDUCTION, DENSITY CONV. | SHORT | DENSITY CONV., REDUCTION | LONG |
| ENLARGEMENT, BINARIZING | LONG | BINARIZING, ENLARGEMENT | SHORT |
| REDUCTION, FILTERING | SHORT | FILTERING, REDUCTION | LONG |
| ENLARGEMENT, EDGE DEC. | LONG | EDGE DEC., ENLARGEMENT | SHORT |
| ... | ... | ... | ... |

FIG. 15

| PROCESSINGS | IMAGE-QUALITY DETERIORATION | PROCESSINGS | IMAGE-QUALITY DETERIORATION |
|---|---|---|---|
| ENLARGEMENT, CONVERTED-TO-RASTER | 10 | CONVERTED-TO-RASTER, ENLARGEMENT | 20 |
| REDUCTION, FILTERING | 15 | FILTERING, REDUCTION | 8 |
| ENLARGEMENT, EDGE DEC. | 9 | EDGE DEC., ENLARGEMENT | 22 |
| REDUCTION, DENSITY CONV. | 20 | DENSITY CONV., REDUCTION | 10 |
| ENLARGEMENT, BINARIZING | 10 | BINARIZING, ENLARGEMENT | 20 |
| ... | ... | ... | ... |

RESEMBLANT EDIT PROCESSINGS

RESULT OF THE PROCESSING INTEGRATION

BEFORE THE PROCESSING ORDER IS CHANGED

AFTER THE PROCESSING ORDER IS CHANGED

IMAGE-EDIT PROCESSING APPARATUS

This application is a continuation of application Ser. No. 07/978,203, filed Nov. 17, 1992, now abandoned.

BACKGROUND OF THE INVENTION

1. Field of the Invention

The present invention relates to an image edit processing apparatus for editing digital images, and an image output apparatus for printing out the processed digital image. More particularly, the invention relates to an apparatus of the type in which image data read by an image scanner, and such editorial jobs as enlargement/reduction, change of resolution, rotation, composition, and correction of tone or brightness are carried out for the read image data by a personal computer or work station or in print service.

2. Description of the Related Art

FIG. 24 is a block diagram showing the construction of an image-edit processing apparatus of prior art. The image-edit processing apparatus of FIG. 24, as a layout scanner, is comprised of an image memory section 241 for storing image data that is read by the scanner, an image edit processing unit 242 for carrying out edit jobs of the image data, which is stored in the image memory unit 241, an edit processing memory unit 243 for storing the edit jobs executed in the image edit processing unit 242 and the order of carrying out the edit jobs, a resolution converting unit 244 for making a resolution conversion in order to match a resolution of the image data generated by the image edit processing unit 242 to that of an output device to be given later, and the output device 245, such as a display or a printer, for outputting the edited image data in the form of an image or a picture.

In the image-edit processing apparatus thus arranged, an image on an original document is read by a scanner, not shown, and is stored as image data into the image memory unit 241. When the image data of the image memory unit 241 is edited, for example, enlarged/reduced, a procedure for the edit processing is read out of the edit processing memory unit 243 by an operation on a keyboard, not shown. In the image edit processing unit 242, the image data is read out of the image memory unit 241 and processed according to the process also read out of the edit processing memory unit 243. The data edited by the image edit processing unit 242 is transferred to the resolution converting unit 244 where the resolution of the edited image data is converted to the resolution of the output device 245. The output device 245 outputs the image data as desired in the form of an image.

Another prior art apparatus is disclosed in Japanese Patent Laid-Open Publication No. Hei. 2-280459. In the prior art, image data is divided into original image data and image data at low resolution in the computer side. The computer edits the image data at low resolution and generates a set of instructions of a procedure to form an image of the final output. According to the set of instructions the computer and another control unit processes the original image data for its outputting.

Thus, the computer generates the set of instructions from the original image data, and another control unit executes the set of instructions. Therefore, the time to transfer the image data to the computer can be reduced.

In the image-edit processing apparatus shown in FIG. 24, the image edit processing unit 242 edits the image data at the same resolution as that of the input image, irrespective of the resolution of the output device 245. Thus, in the conventional apparatus, even when the output device 245 is a low resolution output device such as a CRT display or a printer of which the resolution is lower than that of the input image, the image edit processing unit performs the edit processing at the resolution of the input image. Accordingly, much time must be taken for the image storing operation and edit processing.

The edit processing by the image edit processing unit 242 is performed according to the edit processing procedure stored in the edit processing memory unit 243. After the processing, the resolution converting unit 244 must execute the processing to match the resolution of the image data to that of the output device 245. For this reason, the edit processing takes much time.

In the conventional image-edit processing apparatus, the edit processing stored in the edit processing memory unit 243, for example, resemblance processings such as enlargement and reduction are sequentially executed by the image edit processing unit 242. When several instructions for enlargement/reduction are repeated to obtain an image of a desired size, if the processing is performed by using only the final result of the enlargement/reduction processing, a single processing suffices for gaining such an image. Nevertheless, several executions of instructions according to the procedure that is stored in the edit processing memory unit 243 are required.

Further, in the conventional image edit processing apparatus, the procedure for the edit processing is previously determined in the edit processing memory unit 243. Therefore, in the edit processing not influenced by the resolution, such as color correction, after the number of pixels of an image under process is increased, for example, after the image is enlarged, the correction is carried out. For this reason, much time is taken for the image edit processing. In order that the edit processing is performed at high speed, an expensive hardware is required.

The image-edit processing apparatus described in Published Unexamined Japanese Patent Application No. Hei. 2-280459 is advantageous in that the time to transfer data between the input device and the image edit unit in the computer is reduced. However, the apparatus still involves the problems as stated above since the edit processing is previously determined.

SUMMARY OF THE INVENTION

The present invention has been made to solve the problems as stated above and has an object to provide an image-edit processing apparatus in which the edit processing is efficiently carried out at high speed.

There are a variety of embodiments of an image-edit processing apparatus according to the present invention to achieve the above object.

According to the first embodiment, each edit processing procedure is modified without changing the result of edit processing.

According to the second embodiment, an edit processing procedure is modified according to the characteristics of an input image.

According to the third embodiment, an edit processing procedure is modified according to the input-image characteristics and the processing procedure;

According to the fourth embodiment, an edit processing procedure is modified according to the attributes of the constituent elements of an input image.

According to the fifth embodiment, an edit processing procedure is modified according to the characteristics of an output device.

According to the sixth embodiment, a magnification percentage of a magnification-percentage instruction is modified according to a resolution of according to a resolution of the output device.

According to the seventh embodiment, an object to optimize the processing procedure according to the performances of a CPU and an output device is automatically selected and an edit processing procedure is modified according to the selected object.

According to the eighth embodiment, an edit processing procedure is modified according to the type and order of an edit processing that can be altered without any change of the results of edit processing.

According to the ninth embodiment, an edit processing procedure is modified according to the type of an edit processing that can be replaced with another without any change of the results of edit processing.

According to the tenth embodiment, an edit processing procedure is modified according to the type and order of an edit processing and the cost to execute the edit processing.

According to the eleventh embodiment, an edit processing procedure is modified according to the type and order of an edit processing and an amount of memory necessary for executing the edit processing.

According to the twelfth embodiment, an edit processing procedure is modified according to the type and order of an edit processing and an amount of memory necessary for executing the edit processing.

According to the thirteenth embodiment, an edit processing procedure is modified according to the type and order of an edit processing and a speed of processing for executing the edit processing.

According to the fourteenth embodiment, resemblance edit processings are integrated without changing the results of edit processing.

According to the fifteenth embodiment, the order of a magnification instruction, a color conversion instruction, and a magnification instruction are modified without changing the results of edit processing.

According to the sixteenth embodiment, unnecessary processings are not executed without changing the results of edit processing.

An image-edit processing apparatus according to the first embodiment comprises: image memory unit (11 in FIG. 1) for storing an image; edit processing memory unit (13 in FIG. 1) for storing data for editing the image of the memory unit (11); and edit processing altering unit (14 in FIG. 1) for altering the edit processing data stored in the edit processing memory unit (13) by using the data stored in the edit processing memory unit (13).

In the image-edit processing apparatus of the second embodiment, the edit processing memory unit (13) receives characteristics data of resolution, tone, color space, constituent elements, and the like, and the edit processing altering unit (14) alters edit processing procedure according to the image characteristics data stored in the edit processing memory unit (13).

In the image-edit processing apparatus according to the third embodiment, the edit processing altering unit (14) contains the correspondence of the effective processing procedures and the characteristics of the image, and the edit processing altering unit (14) alters the edit processing procedure according to the image characteristic data while referring to the correspondence.

In the image-edit processing apparatus according to the fourth embodiment, the image memory unit (11) distinctively stores image constituent elements, such as characters, graphics, and raster, and the edit processing altering unit (14) alters the processing procedure of the image constituent elements according to the attributes of said image constituent elements.

In the image-edit processing apparatus according to the fifth embodiment, the edit processing memory unit (13) receives characteristic data of an intended output device (16, 17), such as resolution, tone, color space, processing speed, and the like, and the edit processing altering unit (14) alters the edit processing procedure, which is stored in the edit processing memory unit (13), according to the characteristics of the output device (16, 17).

In the image-edit processing apparatus according to the sixth embodiment, the edit processing memory unit (13) receives a magnification instruction for enlarging/reducing the image and resolution of the output device (16, 17 in FIG. 1), and the edit processing altering unit (14) alters a magnification percentage according to the resolution of the output device (16, 17).

In the image-edit processing apparatus according to the seventh embodiment, the edit processing memory unit (13) receives the performances of a CPU for executing edit processings and the performances of an intended output device (16, 17), the edit processing altering unit (14) selects a processing speed and an object to optimize the processing procedure, such as output picture quality according to the performances of the CPU and the output device (16, 17), and alters the edit processing procedure so as to achieve the optimizing object.

In the image-edit processing apparatus according to the eighth embodiment, the edit processing memory unit (13) receives instructions to process the image, and stores the order of inputting instructions, and the edit processing altering unit (14) alters the types of the image processing instructions, that is stored in the edit processing memory unit, and the order of the instructions.

In the image-edit processing apparatus according to the ninth embodiment, the edit processing memory unit (13) receives instructions to process the image, and stores the order of inputting instructions, and when an instruction of those stored in the edit processing memory unit is of the replaceable type, the edit processing memory unit (14) replaces the place of the instruction in the entering order.

In the image-edit processing apparatus according to the tenth embodiment, the edit processing memory unit (13) receives instructions to process the image, and stores the order of inputting instructions, and the edit processing altering unit (14) contains the correspondence of the types and the entering order of the image processing instructions stored in the edit processing memory unit (13) and the cost of executing the instructions, and when the entering order may be altered and the cost reduction would be advantageous when it is altered, the edit processing altering unit (14) alters the entering order by referring to the correspondence.

In the image-edit processing apparatus according to the eleventh embodiment, the edit processing memory unit (13) receives instructions to process the image, and stores the order of inputting instructions, and when the type and the entering order of the image processing instructions stored in said edit processing memory unit (13) allow the instruction entering order to be altered, and the altering of the entering order would be advantageous in the light of the amount of the memory used, the edit processing altering unit (14) alters the entering order.

In the image-edit processing apparatus according to the twelfth embodiment, the edit processing memory unit (13) receives instructions to process the image, and stores the order of inputting instructions, and when the type and the entering order of the image processing instructions stored in the edit processing memory unit (13) allow the instruction entering order to be altered, and the altering of the entering order would be advantageous in the light of the image quality, the edit processing altering unit (14) alters the entering order.

In the image-edit processing apparatus according to the thirteenth embodiment, the edit processing memory unit (13) receives instructions to process the image, and stores the order of inputting instructions, and when the type and the entering order of the image processing instructions stored in the edit processing memory unit (13) allow the instruction entering order to be altered, and the altering of the entering order would be advantageous in the light of the processing speed, the edit processing altering unit (14) alters the entering order.

In the image-edit processing apparatus according to the fourteenth embodiment, the edit processing memory unit (13) receives instructions to process the image, when a plural number of resemblance image processing instructions, which may be integrated, are stored in the edit processing memory unit, the edit processing altering unit (14) integrates those image processing instructions into a single image processing instruction.

In the image-edit processing apparatus according to the fifteenth embodiment, the edit processing memory unit (13) receives instructions to process the image, when a plural number of magnification instructions are stored in the edit processing memory unit (13), the edit processing altering unit (14) integrates the magnification instructions into a single magnification instruction.

In the image-edit processing apparatus according to the sixteenth embodiment, the edit processing memory unit (13) receives characteristic data of resolution, tone, color space, constituent elements, and the like, and instructions for processing the image, and when the processing result remains unchanged if the image processing instructions stored in the edit processing memory unit (13) are not executed, the edit processing altering unit (14) is inhibited from executing the instructions.

With the first embodiment, image information is gathered by an image scanner, for example, and is stored as image data into the image memory unit. To edit the image data that is stored in the image memory unit, an instruction on a desired edit processing item is given to the edit processing memory unit by operations on a keyboard, for example. The edit processing memory unit transfers edit processing procedures for the instructed edit job to the edit processing altering unit. The edit processing altering unit alters each edit processing procedure, that is stored in the edit processing memory unit, without changing the result of the edit processing. The image edit processing unit produces an output image that results from execution of each altered edit processing procedure.

With the second embodiment, the edit processing memory unit receives image processing instructions from an input device, such as a keyboard, in order to process the image. The characteristics of an input image, such as tone, color space, constituent elements, and the like are input by referring to the image memory unit. The edit processing altering unit alters the edit processing procedure according to the characteristics of the input image stored in the edit processing memory unit. For example, in a case where the edit processing is for binarizing the data and the input image is a binary image, the binarizing instruction in the edit processing memory unit is prohibited from being executed.

With the third embodiment, image processing instructions are entered from the input device, such as a keyboard, in the edit processing memory unit. Specifically, the characteristics of an input image, such as tone, color space, and constituent elements, are entered while referring to the image memory unit. The edit processing altering unit searches the edit processing memory unit to find the correspondence most suitable for the characteristics of the input image, and alters the edit processing procedure according to the correspondence. In a case where the edit processing is for brightness adjustment and the input image is a binary image, the edit processing altering unit refers to such a correspondence that the processing proceeds in the order of B/W-YES conversion and the brightness adjustment. In a case where the edit processing is for brightness adjustment and the input image is an RGB image, the edit processing altering unit refers to such a correspondence that the processing proceeds in the order of RGB-YES conversion and the brightness adjustment. When the input image is a binary image, the edit processing altering unit alters the edit processing procedure in the edit processing memory unit so that the edit processing proceeds in the order of the B/W-YES conversion and the brightness adjustment.

With the fourth embodiment, the image memory unit stored data constituting an image in the order of character data, graphics data, and raster data, for example. In the edit processing memory unit, to process an image, image processing instructions are entered from an input device, such as a keyboard. The edit processing altering unit searches the edit processing memory unit to find the correspondence suitable for processing each constituent element of the input image, and alters the edit processing procedure according to the correspondence. For example, in a case where the edit is an enlargement, if the constituent element of the input image is character data, the edit processing altering unit refers to a font enlarge instruction. If the constituent element of the input image is raster data, it refers to affine transformation instruction. In this way, the edit processings most suitable for the respective portions in the input image are selected and executed.

With the fifth embodiment, in the edit processing memory unit, to process an input image, image processing instructions are entered from an input device, such as a keyboard. The characteristics data of an output device, such as tone, color space, and constituent elements, are input by referring to an output device select unit. The edit processing altering unit alters the edit processing procedure according to the characteristics of the output device, that are stored in the edit processing memory unit. For example, in a case where the edit processing is an edit processing not influenced by tone conversion, such as rotation, it is altered so that it proceeds in the order of binarizing and rotation provided that the input image is in 256-tone levels and the output device is a monochromatic printer.

With the sixth embodiment, in the edit processing memory unit, to enlarge/reduce an image, an operator operates an input device, such as a keyboard, to enter a magnification percentage instruction and a resolution matching to the resolution of the output device. The edit processing altering unit alters a magnification percentage according to the resolution from the input device. In such an example that the edit processing is an enlargement/reduction and the output device is a low-resolution display, the edit processing altering unit alters the magnification percentage so that the resolution matches to the low resolution.

With the seventh embodiment, in the edit processing memory unit, a MIPS value of a CPU constituting the image edit processing unit is entered. The characteristics data of an output device, such as tone, color space, and printing speed, are input by referring to an output device select unit. The edit processing altering unit selects the object to optimize the processing procedure according to the performances of the CPU and the output device. When the output device is a display, for example, the edit processing altering unit selects the object of precedence of processing speed. When it is a high-resolution printer, the edit processing altering unit selects the object of precedence of output image quality. Even when the output device is a display, if the processing speed of the CPU is sufficiently high, the edit processing altering unit selects the object of preference of output image quality. The edit processing altering unit alters the edit processing procedure according to the processing procedure optimizing object.

With the eighth embodiment, in the edit processing memory unit, image processing instructions are entered from an input device, such as a keyboard. The order of entering the instructions is stored. The edit processing altering unit contains the correspondences of the types of replaceable image processing instructions and the instruction entering order in the form of a table, for example. The edit processing altering unit alters the edit processing procedure by referring to the table. For example, the enlargement/reduction processing and rotation processing may be generalized into an affine transformation. Two successive affine transformation processings may be composed into a single affine transformation through a suitable matrix operation. The table as stated above contains the correspondence of [enlargement/reduction, rotation]→ [affine transformation] The edit processing altering unit alters the order of enlargement/reduction and rotation into the affine transformation order by referring to the correspondence in the table.

When the two processings are thus converted into a single processing, the processing speed can be reduced as a whole.

With the ninth embodiment, in the edit processing memory unit, image processing instructions are entered from an input device, such as a keyboard. The order of entering the instructions is stored. The edit processing altering unit contains the correspondences of the types of replaceable image processing instructions and the instruction entering order in the form of a table, for example. The edit processing altering unit alters the edit processing procedure by referring to the table. When the order of executing the color conversion processing and the reduction processing is reversed, the same results of the processing execution are obtained. Accordingly, the table contains the correspondence of [color conversion →←  reduction]. The edit processing altering unit alters the order from the color conversion to the reduction into the order from the reduction to the color conversion by referring to the correspondence in the table.

If the processing to reduce the image size is first executed, the quantity of the processing to be executed in the next image processing is reduced, so that the processing speed is increased as a whole.

With the tenth embodiment, in the edit processing memory unit, image processing instructions are entered from an input device, such as a keyboard. The order of entering the instructions is stored. The edit processing altering unit contains the correspondences of the types of image processing instructions, the instruction entering order, and the cost for the execution in the form of a table, for example. The edit processing altering unit alters the edit processing procedure by referring to the table. The table contains the correspondence of (color conversion, reduction), (10) ←→ (reduction, color conversion), (5). The edit processing altering unit alters the order from the color conversion to the reduction into the order from the reduction to the color conversion, by referring to the correspondence in the table, so as to reduce the cost.

With the eleventh embodiment, in the edit processing memory unit, image processing instructions are entered from an input device, such as a keyboard. The order of entering the instructions is stored. The edit processing altering unit contains the correspondences of the types of image processing instructions, the instruction entering order, and the amount of memory required for the execution in the form of a table of (processing procedure), (memory amount), for example. The edit processing altering unit alters the edit processing procedure by referring to the table. The table contains the correspondence of (color conversion, reduction), (10) ←→ (reduction, color conversion), (5). The edit processing altering unit alters the order from the color conversion to the reduction into the order from the reduction to the color conversion, by referring to the correspondence in the table, so as to reduce the memory amount. (Twelfth invention)

With the twelfth embodiment, in the edit processing memory unit, image processing instructions are entered from an input device, such as a keyboard. The order of entering the instructions is stored. The edit processing altering unit contains the correspondences of the types of image processing instructions, the instruction entering order, and a change of image quality, in the form of a table of (processing procedure), (image quality deterioration), for example. The edit processing altering unit alters the edit processing procedure by referring to the table. The table contains the correspondence of (blur, resolution conversion) (10) ←→ (resolution conversion, blur), (5). The edit processing altering unit blurs the image by referring to the correspondence in the table, and alters the resolution conversion order to the order from the resolution conversion and the blur.

With the thirteenth embodiment, in the edit processing memory unit, image processing instructions are entered from an input device, such as a keyboard. The order of entering the instructions is stored. The edit processing altering unit contains the correspondences of the types of image processing instructions, the instruction entering order, and time to execute the instructions in the form of a table of (processing procedure), (processing time), for example. The edit processing altering unit alters the edit processing procedure by referring to the table. The table contains the correspondence of (color conversion, reduction) (10) →←— (reduction, color conversion), (5). The edit processing altering unit alters the order from the color conversion to the reduction to the order from the reduction to the color conversion so as to reduce the processing time by referring to the table.

With the fourteenth embodiment, in the edit processing memory unit, image processing instructions are entered from an input device, such as a keyboard. The order of entering the instructions is stored. When a plural number of resemblance image processing instructions, which may be integrated, are stored in the edit processing memory unit, the edit processing altering unit integrates those image processing instructions into a single image processing instruction. For example, a plural number of resolution conversion instructions are integrated into a single resolution instruction.

Since the plural number of resemblance instructions are thus integrated into a single instruction by the edit processing altering unit, the processing speed is increased as a whole.

With the fifteenth embodiment, in the edit processing memory unit, image processing instructions are entered from an input device, such as a keyboard. When a plural number of magnification instructions are stored in said edit processing memory unit, said edit processing altering unit integrates the magnification instructions into a single magnification instruction.

Since the plural number of magnification instructions are thus integrated into a single magnification instruction by the edit processing altering unit, the processing speed is increased.

With the sixteenth embodiment, in the edit processing memory unit, image processing instructions are entered from an input device, such as a keyboard. The characteristics of an input image, such as tone, color space, and constituent elements, are entered referring to the image memory unit. According to the image processing instructions and the characteristics of the input image, which are stored in the edit processing memory unit, the edit processing altering unit alters the image processing instructions stored in the edit processing memory unit so that the image processing instructions are not executed, when the processing result remains unchanged if the processings are not executed. For example, when an image of 100 dots × 100 dots is vertically and horizontally reduced into an image 1/100 as large as the original one, the size of the output image is 1 dot × 1 dot. Accordingly, the same results are obtained irrespective of the subsequent convolution filtering of the image data. In such a case, the edit processing altering unit alters the processing procedure so that the convolution filtering processing is not performed.

As described above, the respective edit processings and the order of executing the edit processings, which are stored in the edit processing memory unit, are altered, so that the edit processing for the image can be efficiently executed.

BRIEF DESCRIPTION OF THE DRAWINGS

In the accompanying drawings, which are incorporated in and constitute a part of this specification, illustrate embodiments of the invention and, together with the description, serve to explain the objects, advantages and principles of the invention. In the accompanying drawings:

FIG. 1 is a block diagram showing an embodiment of an image edit processing apparatus according to the present invention;

FIG. 2 is a flow chart showing a flow of procedural operations of an edit processing altering unit in the embodiment of the present invention;

FIGS. 3(a), 3(b), and 3(c) are each diagrams showing an example of the operation to alter the edit processing in accordance with the tone of the output device in the embodiment of the present invention;

FIG. 4 is a flow chart showing a flow of procedural operation of an image edit processing apparatus according to another embodiment of the present invention.

FIG. 5 is a table showing the correspondence of color spaces of an input image and edit processings suitable for the color space;

FIG. 7 is a table showing the correspondence of constituent elements of an input image and edit processings suitable for the constituent elements;

FIG. 8 is a flow chart showing a flow of procedural operation of an image edit processing apparatus according to yet another embodiment of the present invention;

FIGS. 9(a) and 9(b) are each diagrams showing an example of the operation to alter the edit processing in accordance with the tone of the output device in the embodiment of the present invention;

FIG. 10 is a block diagram showing another embodiment of an image edit processing apparatus according to the present invention;

FIGS. 11, 12, and 13 flow charts showing edit processing operations of the image-edit processing apparatus of FIG. 10;

FIG. 14 is a table showing the correspondence of sets of ordered edit processings and times for executing the processings;

FIG. 15 is a table showing the correspondence of sets of ordered edit processings and quantities of image quality deterioration;

DESCRIPTION OF THE PREFERRED EMBODIMENTS

Figure 6:
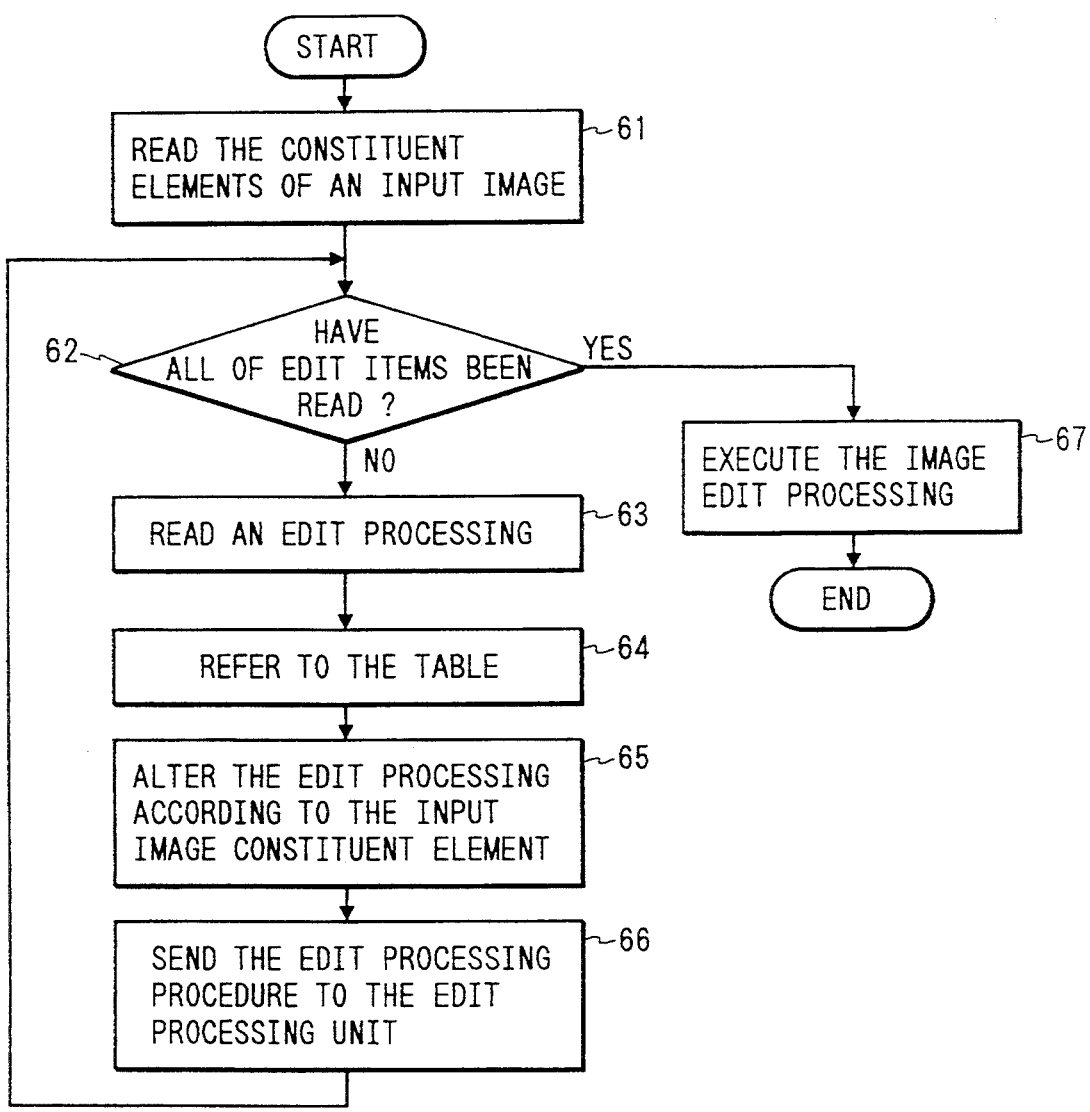
FIG. 6 is a flow chart showing a flow of procedural operation of an image edit processing apparatus according to still another embodiment of the present invention.

FIG. 1 is a block diagram showing an embodiment of an image edit processing apparatus according to the present invention. The image edit processing apparatus of FIG. 1 is comprised of an image memory unit 11 for reading an image by an image scanner, for example, and storing it as image data, an image edit processing unit 12 for editing the image data that is stored in the image memory unit 11, an edit processing memory unit 13 for storing the respective edit processings executed in the image edit processing unit 12 and the order of executing the edit processings, an edit processing altering unit 14 for altering the order of the edit processings stored in the edit processing memory unit 13, an output device select unit 15 for selecting an output device for outputting an image after the edit processing, and an output device selected by the output device select unit 15, such as a display 16 or a printer 17. The edit processing altering unit 14 is comprised of a resolution converting unit 141 for converting a resolution of the image data to the resolution matching to that of the output device, a processing procedure altering unit 142 for altering the processing procedure, thereby improving the efficiency of the edit processing, a processing-order replacing unit 143 for replacing the place of a processing in the processing order with another, thereby improving the efficiency of the edit processing, an optimizing object select unit 144 for selecting optimizing objects, such as processing speed increase and image quality improvement by referring to the CPU for executing the edit processing and the performances of the image output device, a resemblance processing integrating unit 145 for integrating resemblance processings, such as repetitive executions of enlargement/reduction instructions, and an unnecessary-processing omitting unit 146. When an input image is a binary image, unnecessary processing, or the execution of a binarizing instruction input to the edit processing memory unit 13 is omitted.

The image edit processing apparatus thus constructed reads an image by an image scanner, not shown, and stores it as image data into the image memory unit 11. To process the image data that is stored in the image memory unit 11, the instructions of a plural number of edit items are instructively entered into the apparatus by operating on a keyboard, not shown. In response to the instructions, an edit processing procedure for each edit item is read out of the edit processing memory unit 13. Those edit processing procedures are resolution conversion, enlargement/reduction, rotation, color correction, and the like. The edit processing altering unit 14 alters the edit processing procedures into the resolution matching processing for matching a resolution of image data to that of an output image, the integrating processing for integrating a plurality of processings into a single processing, the order altering processing for altering the order of executing the processings or the like. The processing procedure alteration is carried out by referring to the characteristics of an input image, output device, and a CPU for edit processing execution, or the correspondence of the types and the order of processings, which is most suitable for the characteristics.

In the image edit processing unit 12, the image data is read out of the image memory unit 11 and is processed according to an edit processing procedure fetched from the edit processing altering unit 14. In the image edit processing unit 12, the edited data is output by the output device selected by the output device select unit 15, for example, the display 16 or the printer 17.

FIG. 2 is a flow chart showing a flow of procedural operations in the embodiment of the present invention.

In a step 201, the edit processing memory unit 13 reads a tone of the output device selected by the output device select unit 15, for example, the display 16 or the printer 17.

In a step 202, the edit processing memory unit 13 reads a tone of the image data from the image memory unit 11.

In a step 203, it compares the tone of the output device that is read in the step 201 with the tone of the image data that is read in the step 202, and checks whether or not the tone of the output device is lower than that of the image data. If the tone of the output device is lower than that of the image data, a step 204 is executed. If the former is higher than the latter, a step 210 is executed.

In the step 204, the edit processing altering unit 14 reads the image edit processing from the edit processing memory unit 13.

In a step 205, the edit processing memory unit 13 checks whether or not the results of edit processing will be changed when the input image tone is altered, while referring to the image edit processing that is read in the step 204. Specifically, if the image edit processing contains only a rotation procedure, the processing results are left unchanged if the input image tone is converted. If an edit processing, such as a convolution filter, is contained in the edit processing, a different tone brings about different processing results. Therefore, it should avoid to convert the input image tone. Thus, when the edit processing results are left unchanged if the tone of the input image is changed, the control by the system goes to a step 206. When the processing results are changed, control goes to a step 209.

In a step 207, the edit processing memory unit 13 refers to the processing for converting the tone contained in the image edit processing that is read in the step 204, and calculates the tone of an input image so as to be the tone of the output device that is read in the step 201, after the input image is processed by the image edit processing unit 12.

In a step 208, the edit processing altering unit 14 sends to the image edit processing unit 12 an instruction for converting the tone of the image data, which is stored in the image memory unit 12, into the tone calculated in the step 207 or the tone of the output device read in the step 201.

In the step 210, the image edit processing read in the step 204 is transferred to the image edit processing unit 12.

In a step 211, the instruction to convert the tone to the tone of the output device read in the step 201 is sent to the image edit processing unit 12.

In a step 212, the image edit processing unit 12 executes an edit processing according to the image edit processing received from the edit processing altering unit 14.

In a step 213, the image data processed in step 212 is output through the output device, the display 16 or the printer 17, which is selected by the output device select unit 15.

FIG. 3 is a diagram showing an example of the operation to alter the edit processing in accordance with the tone of the output device in the embodiment of the present invention.

In an example shown in FIG. 3(a), an edit processing procedure for a 256-color printer is stored in the edit processing memory unit 13 and an input image is in 256-tone levels. The image data, which is stored in the image memory unit 11, is edited according to the edit processing procedure of rotation, which is stored in the edit processing memory unit 13. In this example, no tone conversion is required since the tone of the input image is the same as that of the output image. In another example shown in FIG. 3(b), in order to gain the same result as above, or the result of the same rotation processing, the same processing is altered to the processing for output to a 1024-color printer by the edit processing altering unit 14. In this example, after the image data of 256-tone levels is processed for rotation, a tone conversion instruction for converting the tone to a 1024-tone levels is executed.

In an additional example shown in FIG. 3(c), in order to gain the same result as above, or the result of the same rotation processing, the same processing is altered to the processing for output to a monochromatic printer by the edit processing altering unit 14. In this example, after the image data of 256-tone levels is binarized to reduce the amount of image data, the processing for rotation is executed.

Thus, in the examples of FIGS. 3(a), 3(b), and 3(c), the edit processing for the same input image is altered so as to match to the tones of the output images of the output devices used. For the output device of a small number of tone-levels, an input image with an excessively large number of tone levels is converted into an image of a small number of tone levels, it is edit processed. Accordingly, the amount of image data to be processed is reduced, so that the processing speed is improved and the memory capacity of a memory used can be reduced.

FIG. 4 is a flow chart showing a flow of procedural operation of an image edit processing apparatus according to another embodiment of the present invention. FIG. 5 is a table showing the correspondence of color spaces of an input image and edit processings suitable for the color space. The table can be referred to by the edit processing altering unit 14.

The edit processing by the image edit processing apparatus will be described with reference to FIG. 4.

In a step 41, the edit processing memory unit 13 reads a color space of the image data, which is stored in the image memory unit 11.

In a step 42, the system control checks whether or not all of the edit items instructed by operations on a keyboard, not shown, have been read. When the edit items have all been read, the system goes to a step 47. When those are not yet read, the system goes to a step 43.

In the step 43, the edit processing altering unit 14 reads one edit item out of the edit processing memory unit 13.

In a step 44, the system refers to the table showing the correspondence of color spaces of an input image and edit processings suitable for the color space, and gains the edit processing according to the edit item read out in the step 43 with relation to the color space of the image data read in the step 41.

When the edit item read out in the step 43 is "brightness adjustment" and the color space of the input image is "monochrome", an edit processing, [the B/W-YES conversion→edit processing of brightness adjustment], is gained referring to the table. When the color space of the input image is "RGB", another edit processing, [the RGB-YES conversion→edit processing of brightness adjustment], is gained.

When the edit item read out in the step 43 is "binarizing" and the color space of the input image is "monochrome", information "no edit processing is performed referring to the table" is gained. When the color space of the input image is "RGB", an edit processing of RGB-B/W conversion is gained.

In a step 45, the edit read out in the step 43 is altered into the edit processing obtained in the step 44.

In a step 46, the edit processing procedure that is altered by the edit processing altering unit 14 is sent to the image edit processing unit 12. Then, the system control returns to the step 42 to read the next edit item.

In a step 47, the edit processing is executed since all of the edit items have been read out in the step 42 and the edit processing altered according to each edit item has been sent to the image edit processing unit 12.

As described, for the same instructed edit item, the edit processing is properly selected for its execution according to the characteristics of the input image.

Such a redundant processing that the binary image is processed again for binarizing can be avoided. Accordingly, the processing speed is improved and a high speed image edit processing is realized.

FIG. 6 is a flow chart showing a flow of procedural operation of an image edit processing apparatus according to still another embodiment of the present invention. FIG. 7 is a table showing the correspondence of constituent elements of an input image and edit processings suitable for the constituent elements. The table can be referred to by the edit processing altering unit 14.

The edit processing by the image edit processing apparatus will be described with reference to FIG. 6.

In a step 61, the edit processing memory unit 13 reads the constituent elements of the image data from the image memory unit 11.

In a step 62, the system control checks whether or not all of the edit items instructed by operations on a keyboard, not shown, have been read. When the edit items have all been read, the system goes to a step 67. When those are not yet read, the system goes to a step 63.

In the step 63, the edit processing altering unit 14 reads one edit item out of the edit processing memory unit 13.

In a step 64, the system refers to the table showing the correspondence of constituent elements of an input image and edit processings suitable for the constituent elements, and gains the edit processing according to the edit item read out in the step 63 with relation to the constituent elements of the image data read in the step 61.

When the edit item read out in the step 63 is "enlargement/reduction" and the constituent element is the character, the edit processing of "the font size altering" is obtained referring to the table. When the constituent element of the input image is "graphics", the edit processing of "vector coordinate transformation" is obtained. When the constituent element of the input image is "raster", the edit processing of affine transformation is obtained.

When the edit item read out in the step 63 is "movement", and the constituent element of the input image is "character", the edit processing of "first-character coordinate transformation" is obtained after referring to the table. When the constituent element of the input image is "graphics", the edit processing of "vector coordinate transformation" is obtained. When the constituent element of the input image is "raster", the edit processing of "affine transformation" is obtained.

In a step 65, the edit processing read out in the step 63 is altered into the edit processing gained in the step 64.

In a step 66, the edit processing procedure altered by the edit processing altering unit 14 is sent to the image edit processing unit 12. Then, the system returns to the step 62 to read out the next edit item.

In a step 67, the edit processing is executed since all of the edit items have been read out in the step 62 and the edit processing altered according to each edit item has been sent to the image edit processing unit 12.

As described, for the same instructed edit item, the edit processing is properly selected for its execution according to the constituent elements of the input image. When character information expressed by character codes and graphics information expressed by vector data are affine transformed after the information are transformed into "raster", optimum font data and raster data after vector-raster transformation are altered, so that the image quality is often deteriorated. This defect can be eliminated by the embodiment thus far described. Accordingly, the image quality of the output image is improved, and a high quality image edit processing is realized.

FIG. 8 is a flow chart showing a flow of procedural operation of an image edit processing apparatus according to yet another embodiment of the present invention.

In a step 81, the edit processing altering unit 14 reads a resolution of an output device selected by the output device select unit 15, for example, the display 16 or the printer 17 shown in FIG. 1.

In a step 82, the system control checks whether or not all of the edit items instructed by operations on a keyboard, not shown, have been read. When the edit items have all been read, the system goes to a step 30. When those are not yet read, the system goes to the next step 83.

In the step 83, the edit processing altering unit 14 reads one edit item out of the edit processing memory unit 13.

In a step 84, the system control checks whether or not the edit item read out of the edit processing memory unit 13 is "enlargement/reduction". If the answer is YES, the system goes to the next step 85. If the answer is NO, the system goes to a step 87.

In the step 85, if the edit item is "enlargement/reduction", the edit processing procedure is altered to an edit processing procedure which alters a magnification percentage in accordance with the resolution of the output device, that is selected by the output device select unit 15.

In a step 86, the edit processing procedure altered by the edit processing altering unit 14 is sent to the image edit processing unit 12. Then, the system returns to the step 82 for reading the next edit item.

In a step 87, when the readout edit item does not indicate the "enlargement/reduction", the system checks whether or not the edit item indicates "color correction" processing. In the step 87, if it does not "color correction processing", the system successively checks the edit items till it finds an intended edit item. When the intended edit item is found, the edit processing procedure is altered to an edit processing procedure suitable for the edit item by the edit processing altering unit 14.

In a step 88, if the edit item is not "enlargement/reduction", but "color correction", the edit processing procedure is altered such that the "color correction" processing is first executed in the edit processing altering unit 14, and the "enlargement/reduction" is then executed.

In a step 89, the edit processing procedure altered in the edit processing altering unit 14 is sent to the image edit processing unit 12. Thereafter, the system returns to the step 82 for reading out the next edit item.

In the step 30, the edit processing is executed since all of the edit items have been read out in the step 82 and the edit processing altered according to each edit item has been sent to the image edit processing unit 12.

FIG. 9 is a diagram showing an example of the operation to alter the edit processing in accordance with the tone of the output device in the embodiment of the present invention.

In an example of FIG. 9(a), an edit processing procedure for a printer of the resolution of 400 dots (400 dpi) per 25.4 mm is stored in the edit processing memory unit 13. The image data stored in the image memory unit 11 is processed in accordance with an 2-times enlargement edit processing procedure and a color correction edit processing procedure, which are stored in the edit processing memory unit 13.

In another example of FIG. 9(b), in order to obtain the same result as above, the same result of the color correction processing as that of the 2-times enlargement processing, the edit processing altering unit 14 alters the edit processing procedure into such an edit processing procedure as to drive the display 16 of the resolution of 100 dots (100 dpi) per 25.4 mm. If the image prepared so as to be displayed at 400 dpi is displayed by the display 16 of 100 dpi, the display image has the length four times (sixteen times in area) as large as that of the original one. Accordingly, to display the image of 400 dpi by the display of 100 dpi, a magnification percentage of the image is reduced to ¼ by the "enlargement/reduction" processing.

To double the size of the image, a magnification percentage of the image is reduced to ½ (0.5) by the 400 dpi "enlargement/reduction" processing. The image displayed on the display of 100 dpi is doubled in size.

In the examples of FIGS. 9(a) and 9(b), an input image having a resolution and a size is processed so that an image of the equal size is obtained by changing the resolution, and is output to the printer 17 and the display 16. For the display 16 of low resolution, the number of pixels to be color-correction processed is reduced to 1/16. The time for the edit processing is also reduced 1/16.

Figure 24:
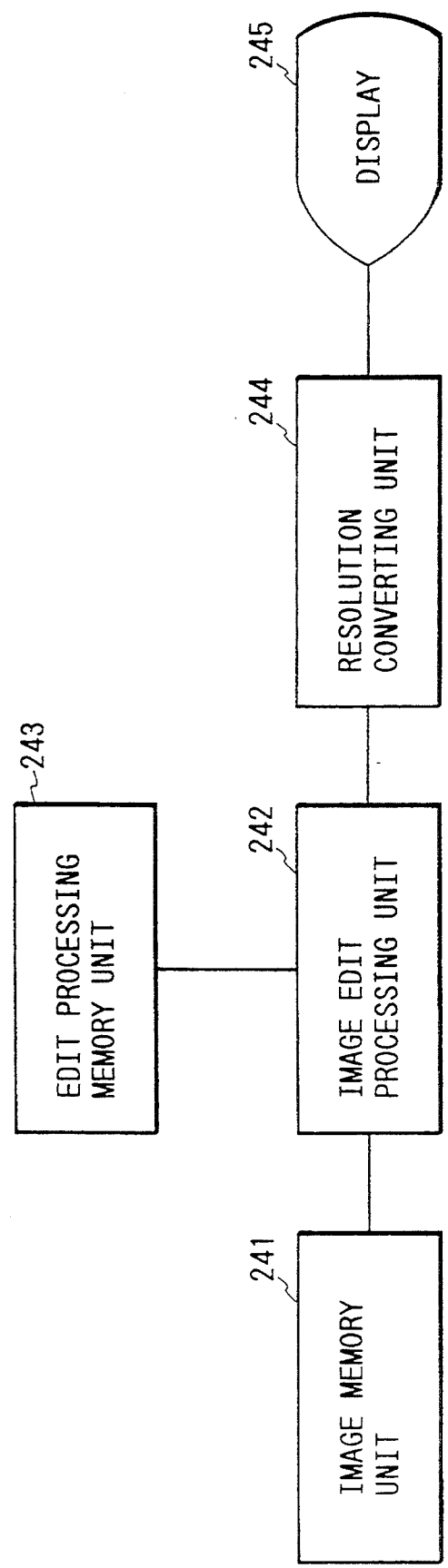
FIG. 24 is a block diagram showing the construction of an image-edit processing apparatus of prior art.

As seen from the foregoing description, in the image edit processing apparatus of the invention, the resolution converting unit (244 in FIG. 24) is not required when the output device is changed to another. Incidentally, the resolution converting unit is essential in the conventional apparatus. This feature contributes to cost reduction.

Thus, the image edit processing apparatus of the invention, through the above-mentioned edit processings, can produce the result of image edit processings in accordance with the resolution of the display used, without using an independent resolution converting unit. Further, when the image edit processing apparatus is used, the output device of low resolution can be operated at higher speed. Then, it is suitable for the proof print as the object of many low-resolution output device.

FIG. 10 is a block diagram showing another embodiment of an image edit processing apparatus according to the present invention.

The image edit processing apparatus of FIG. 10 is different from that of FIG. 1 in that two buffers (denoted as 1047 and 1048 in FIG. 10) are additionally provided for storing the edit items read out of the edit processing memory unit 13 by the edit processing altering unit 14, and the edit processing altering unit 14 alters the edit processing procedures in different ways. FIG. 11 is a flow chart showing a flow of operations in the edit processing altering unit.

In a step 1101, the edit processing altering unit 14 reads the characteristics of the image stored in the image memory unit 11, such as resolution, tone, color space, and constituent elements.

In a step 1102, the edit processing altering unit 14 checks a processing speed of a CPU constituting the image edit processing unit. It investigates a MIPS value of the CPU, for example.

In a step 1103, the edit processing altering unit 14 reads a resolution of the output device, e.g., the display 16 or the printer 17 in FIG. 1, selected by the output device select unit 15.

In a step 1104, the system control checks whether or not the resolution of the output device is high, e.g., it is 300 dpi or more. If it is high, the system goes to the next step 1105. If it is not high, the system goes to a step 1108.

In the step 1105, the system checks whether or not the MIPS value of the CPU of the image edit processing unit is sufficiently high; for example, it is 30 MIPS or more. If it is sufficiently high, the system goes to the next step 1106. If the MIPS of the CPU is not sufficiently high, the system goes to the step 1108.

In the step 1106, the edit processing altering unit 14 alters the edit processing procedure stored in the edit processing memory unit 13 into an output-image-quality-precedence processing procedure. A flow of the operation of the edit processing altering unit 14 when the output image quality processing precedes is shown in details in FIG. 12.

Figure 13:
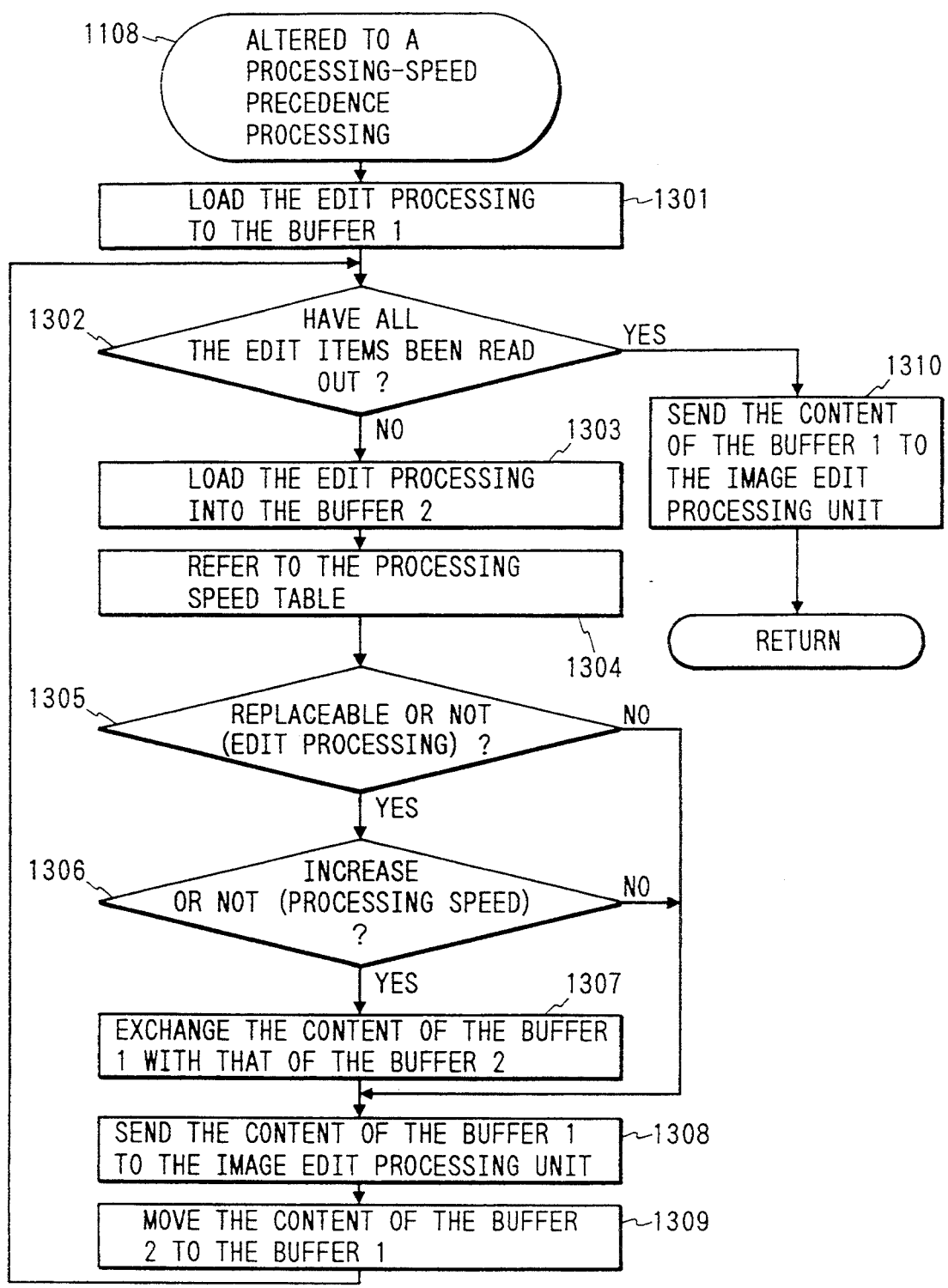

In the step 1108, the edit processing altering unit 14 alters the edit processing procedure of the edit processing memory unit 13 into an edit processing procedure in which the processing speed precedes. A flow of the operation of the edit processing altering unit when the processing-speed processing precedes is shown in details in FIG. 13.

In a step 1107, the edit processing is executed since, in the step 1106 or 1108, all of the edit items have been read out, the edit processing procedure suitable for the edit processing object has been sent to the image edit processing unit 12.

Figure 12:
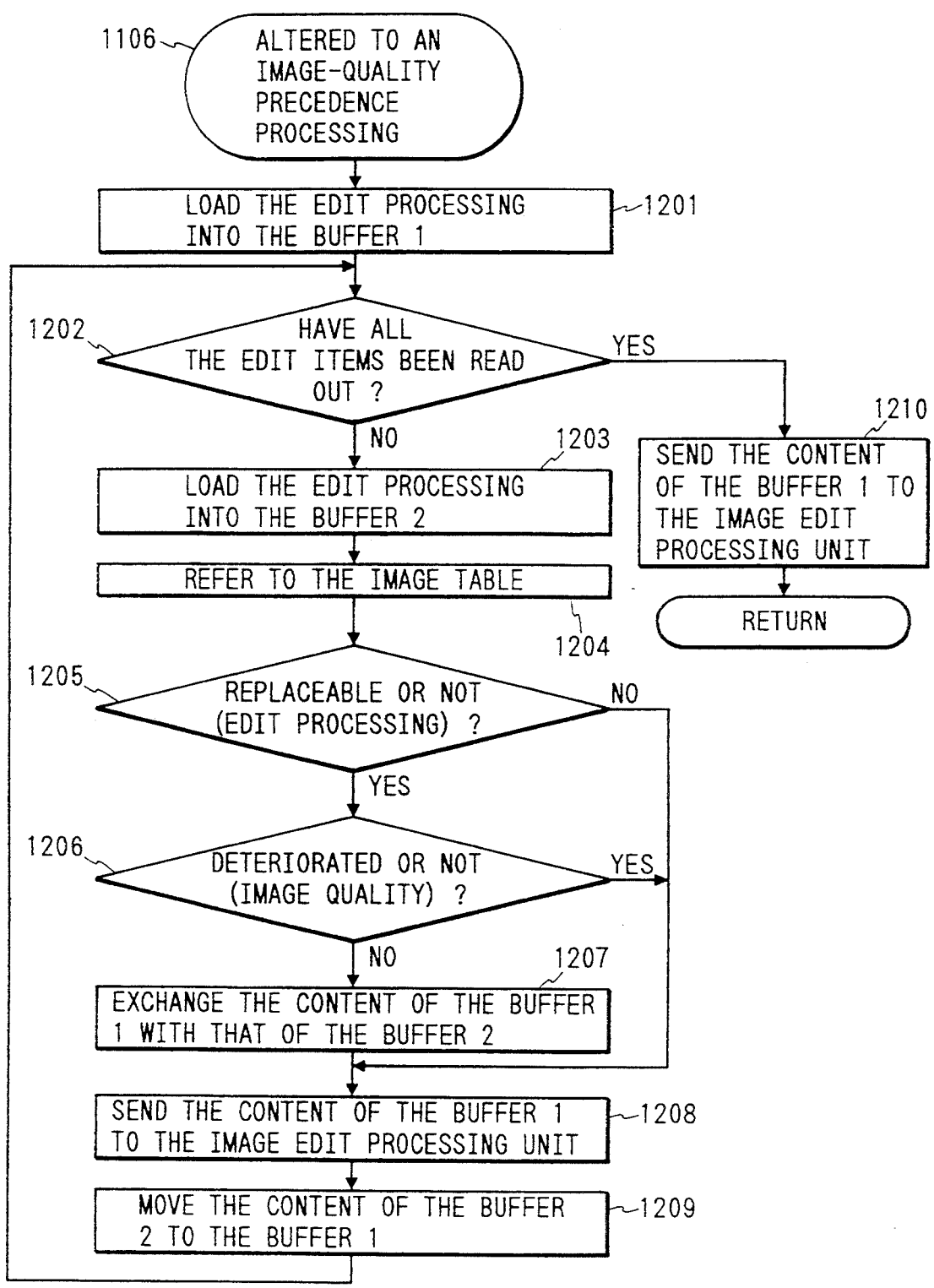

FIG. 12 is a flow chart showing a flow of the operation of the edit processing altering unit when the output image quality processing precedes.

In a step 1201, the edit processing altering unit 14 reads an edit item from the edit processing memory unit 13 and loads it into the buffer 1.

In a step 1202, the system control checks whether or not all of the edit items instructed from a keyboard, not shown, have read. If the edit items have all been read out, the system goes to a step 1210 where the content in the buffer 1 of the edit processing altering unit 104 is transferred to the image edit processing unit 102. If not, it goes to a step 1203.

In a step 1203, the edit processing altering unit 14 reads an edit item from the edit processing memory unit 13 and loads it into the buffer 2.

In a step 1204, the system refers to a table contained in the edit processing altering unit, with the combination of the edit items loaded into the buffers 1 and 2. The table, as shown in FIG. 15, contains replaceable edit items and numerical values of image-quality-deterioration quantities caused when the edit items are executed. The numerical values representing the image-quality-deterioration quantities may be functions of the input image characteristics, such as resolution, tone, number of pixels, and constituent elements. Or it may be parameters of the edit items, such as magnification percentage in the "enlargement/reduction" processing, and a rotating angle in the "rotation" processing.

In a step 1205, the system checks if the edit item is replaceable referring to the table of FIG. 15. If it is replaceable, the system goes to the next step 1206. If it is not replaceable, the system goes to step 1208.

In the step 1206, the system checks if the image quality is deteriorated when the edit item is replaced with another referring to the FIG. 15 table. In FIG. 15, a set of edit processings in a column are each replaceable with another. In the processing where the enlargement and the conversion-to-raster are executed in this order, when the conversion-to-raster processing follows the enlargement processing in their execution, the image quality will be more deteriorated than when the processings are executed in the reverse order. If the edit item is replaced and the image quality is deteriorated, the system goes to the step 1208. If it is not deteriorated, the system goes to the next step 1207.

In the step 1207, the order of executing the edit items is changed by exchanging the content of the buffer 1 with that of the buffer 2.

In a step 1208, the content of the buffer 1 as the edit item to be first executed is transferred to the image edit processing unit 12.

In the step 1208, the content of the buffer 2 is transferred to the buffer 1 in order to load the next edit item to the buffer 2. Then, the system returns to the step 1201.

In a step 1301, the system control checks whether or not all of the edit items instructed from a keyboard, not shown, have read. If the edit items have all been read out, the system goes to a step 1301. If not, it goes to a step 1303.

In a step 1303, the edit processing altering unit 14 reads an edit item from the edit processing memory unit 13 and loads it into the buffer 2.

Figure 16:
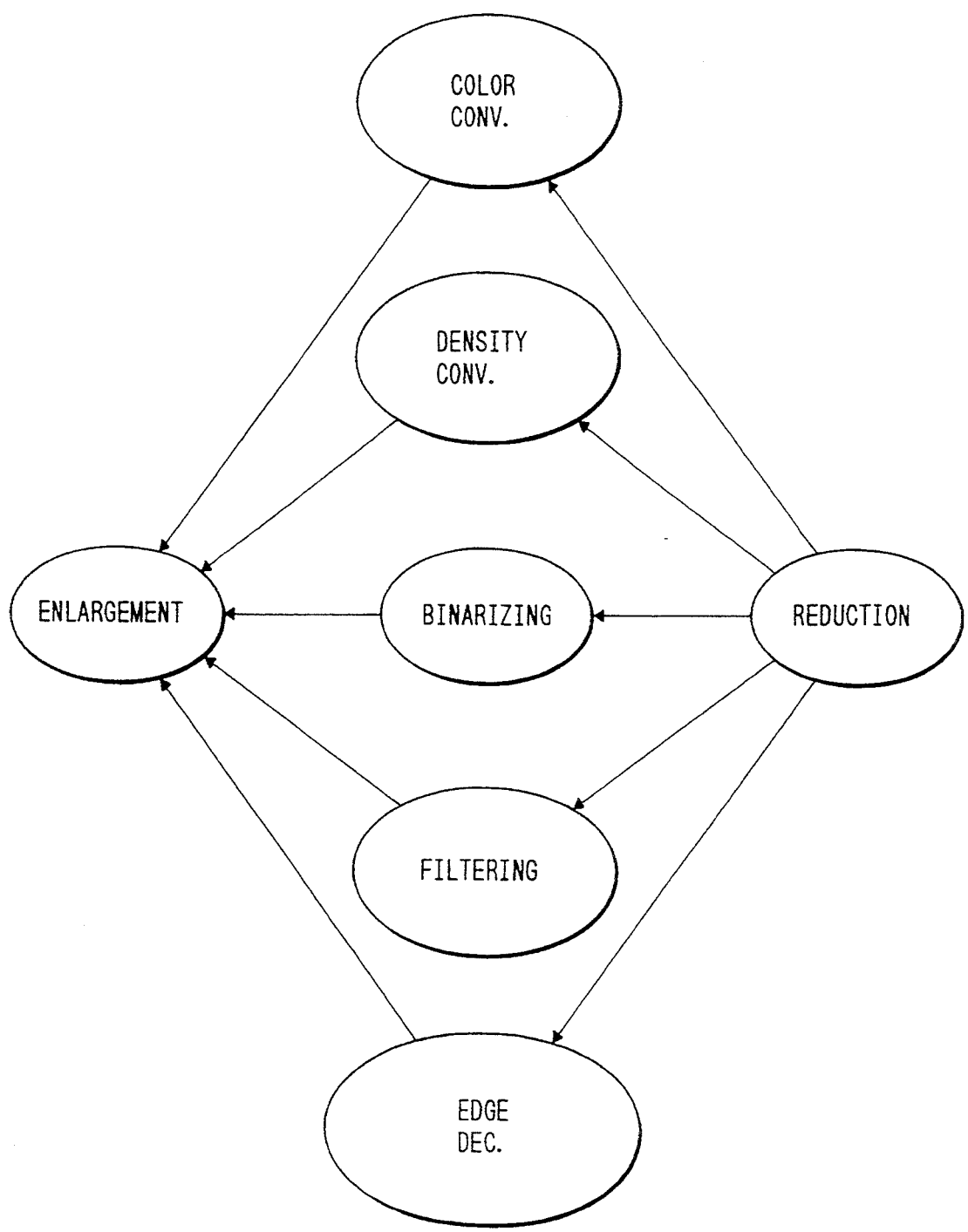
FIG. 16 is an arrow-contained graph depicting the correspondence of sets of ordered edit processings and times for executing the processings.
Figure 17:
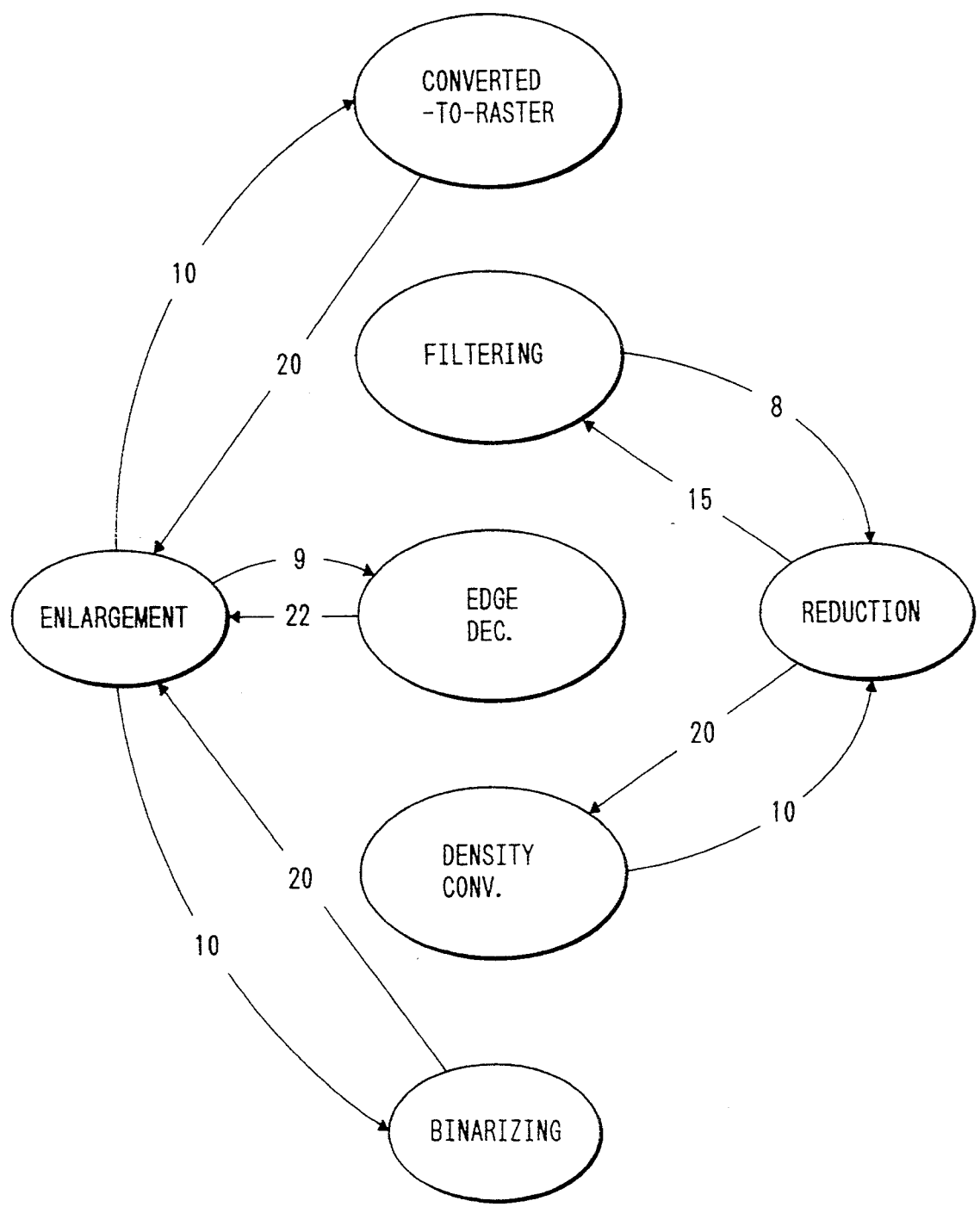
FIG. 17 is a weighing graph depicting the correspondence of sets of ordered edit processings and times for executing the processings.

In a step 1304, the system refers to a processing-time table contained in the edit processing altering unit, with the combination of the edit items loaded into the buffers 1 and 2. The table, as shown in FIG. 14, contains replaceable edit items and the processing times, long or short, taken when the edit items are executed. The processing time may be functions of the input image characteristics, such as resolution, tone, number of pixels, and constituent elements. It may be the functions of the characteristics of the output device, such as resolution, display or printing speed, and color space. It may also be parameters of the edit items, such as magnification percentage in the "enlargement/reduction" processing, and a rotating angle in the "rotation" processing. Further, it may be proper numerical values or the functions of ambient of other image edit processing unit. The expression of the table contents is not limited to the table shown in FIG. 4, but may be expressed in terms of an arrow-contained graph as shown in FIG. 16 or a weighing graph as shown in FIG. 17.

In a step 1305, the system checks whether the edit item is replaceable or not, referring to the processing speed table of FIG. 14. If it is replaceable, the system goes to the next step 1306. If not, it goes to a step 1308.

In the step 1306, the system checks whether or not the replacement of the edit item leads to reduction of the processing time, referring to the FIG. 14 processing speed table. In FIG. 14, a set of edit processings in a column are each replaceable with another. In the processing where the enlargement and the color conversion are executed in this order, when the color conversion processing follows the enlargement processing in their execution, the processing time will be shorter than when the processings are executed in the reverse order. If the edit item is replaced and the processing time is not reduced, the system goes to the step 1308. If it is reduced, the system goes to the next step 1307.

In the step 1307, the order of executing the edit items is reversed by exchanging the content of the buffer 1 with that of the buffer 2.

In a step 1308, the content of the buffer 1 as the edit item to be first processed is transferred to the image edit processing unit 12.

In a step 1309, the content of the buffer 2 is transferred to the buffer 1 in order to load the next edit item to the buffer 2. Then, the system returns to the step 1301.

In a step 1310, the last edit item left in the buffer 1 is sent to the image edit processing unit 102, and the system returns to the flow chart of FIG. 11.

Figure 18:
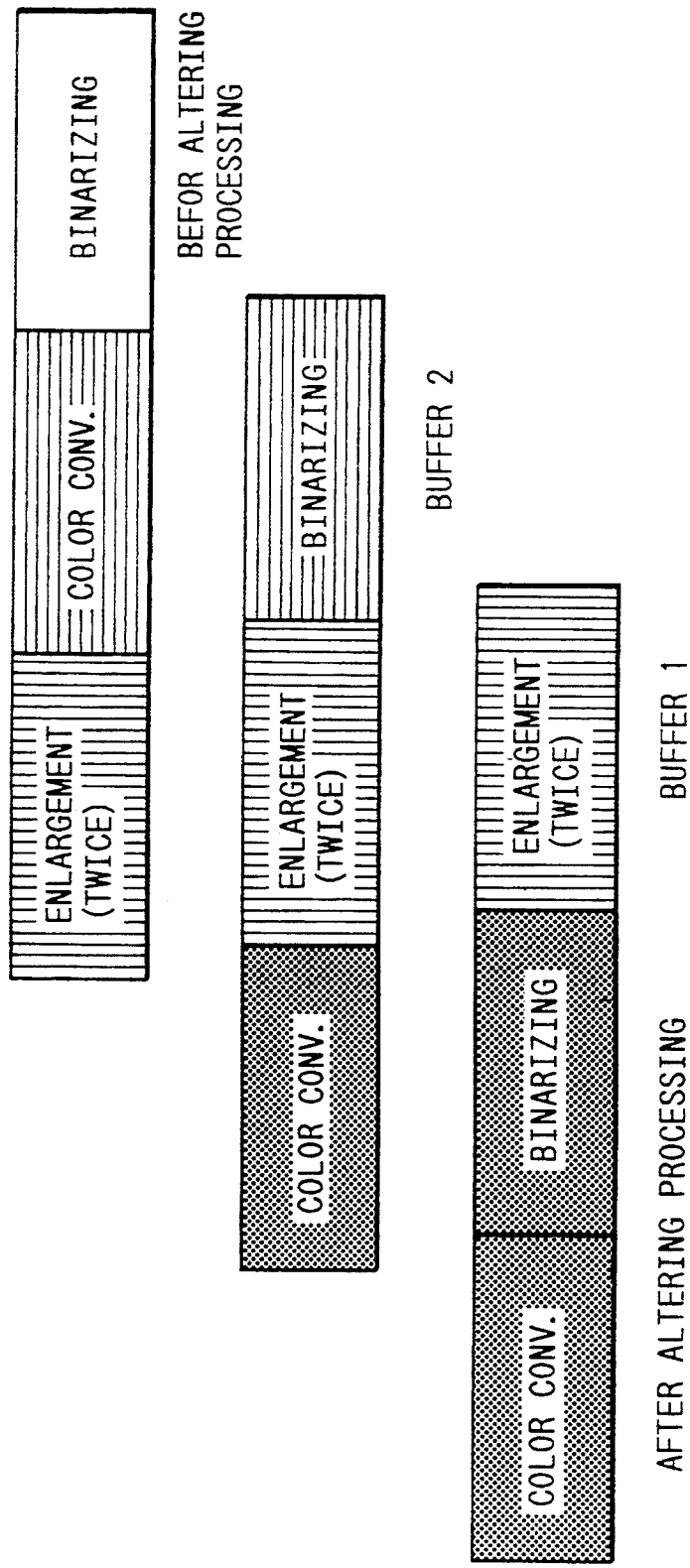
FIG. 18 is a diagram showing an example of the operation to alter the edit processing in the above-mentioned embodiment of the present invention.

FIG. 18 is a diagram showing an example of the operation to alter the edit processing in the above-mentioned embodiment of the present invention.

In the example, the image-edit processing apparatus is provided with a monochromatic printer of 600 dpi as the output device. The input image data of 24 bits/pixel has the size of 1000×1000 dots. In an edit processing, which is executed in the order of the 200% enlargement processing, the color conversion processing, and finally the binarizing processing, which are all stored in the edit processing memory unit 13, the order of those edit items is altered.

As seen from the flowchart of FIG. 11, since the output device has a high resolution, the processing-speed precedence processing is selected (1108 in FIG. 11), and the edit processing for alteration of FIG. 12 is executed. In the first loop, the enlargement/reduction processing is stored in the buffer 1, and the color conversion processing is stored in the buffer 2. When referring to the table of FIG. 14, it is seen that the altering of the order of the enlargement/reduction and the color conversion leads to the processing time reduction. Then, the order is altered and the color conversion is sent to the image edit processing unit, and the enlargement/reduction processing is stored in the buffer 1.

In the second loop, the enlargement/reduction processing is stored in the buffer 1, and the binarizing processing is stored in the buffer 2.

In the step 1202 of FIG. 12 in the third loop, since the edit item to be read out anew is absent, the system does not enter the loop and sends the enlargement/reduction processing to the image edit processing unit, and executes the image edit processing in the order optimized so that the processing speed precedes.

Figure 19:
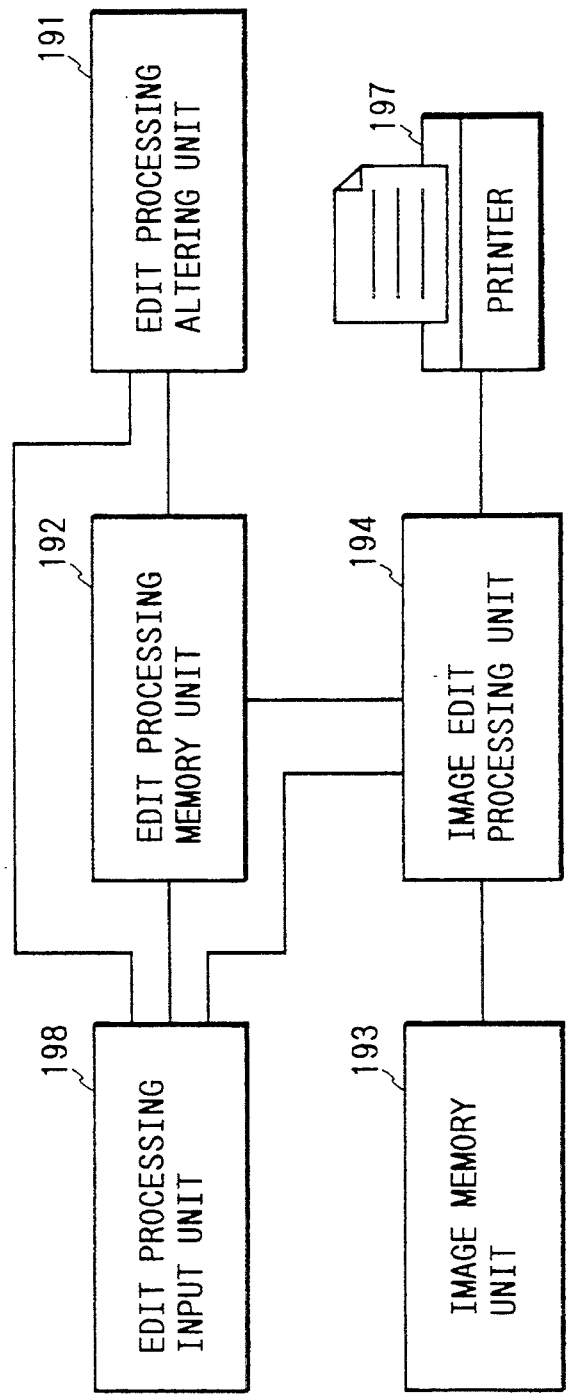
FIG. 19 is a block diagram showing yet another embodiment of an image edit processing apparatus according to the present invention.
Figure 20A:
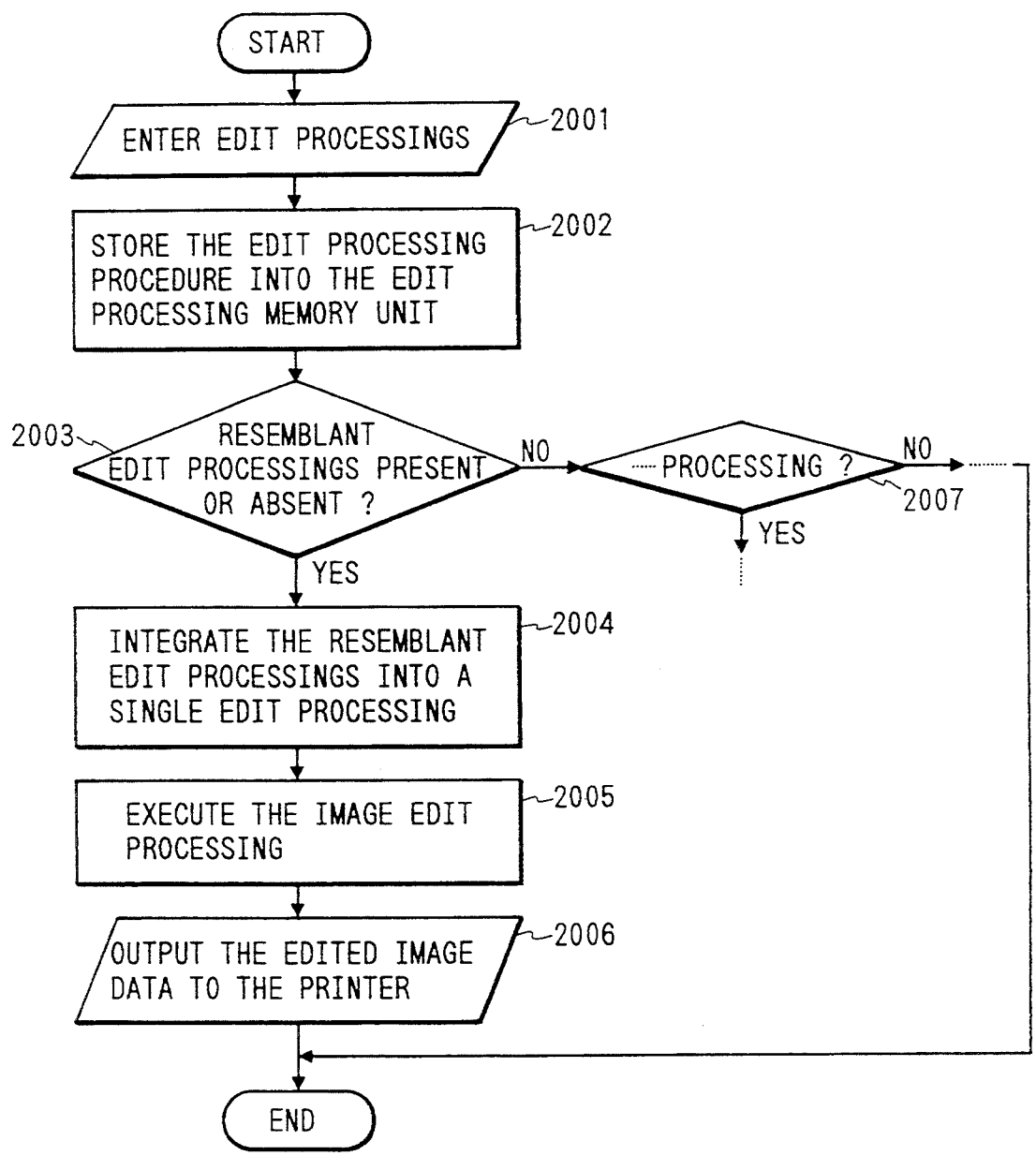
FIGS. 20(a) and 20(b) are Flow charts showing different edit processing operations of the image-edit processing apparatus of FIG. 19.
Figure 20B:
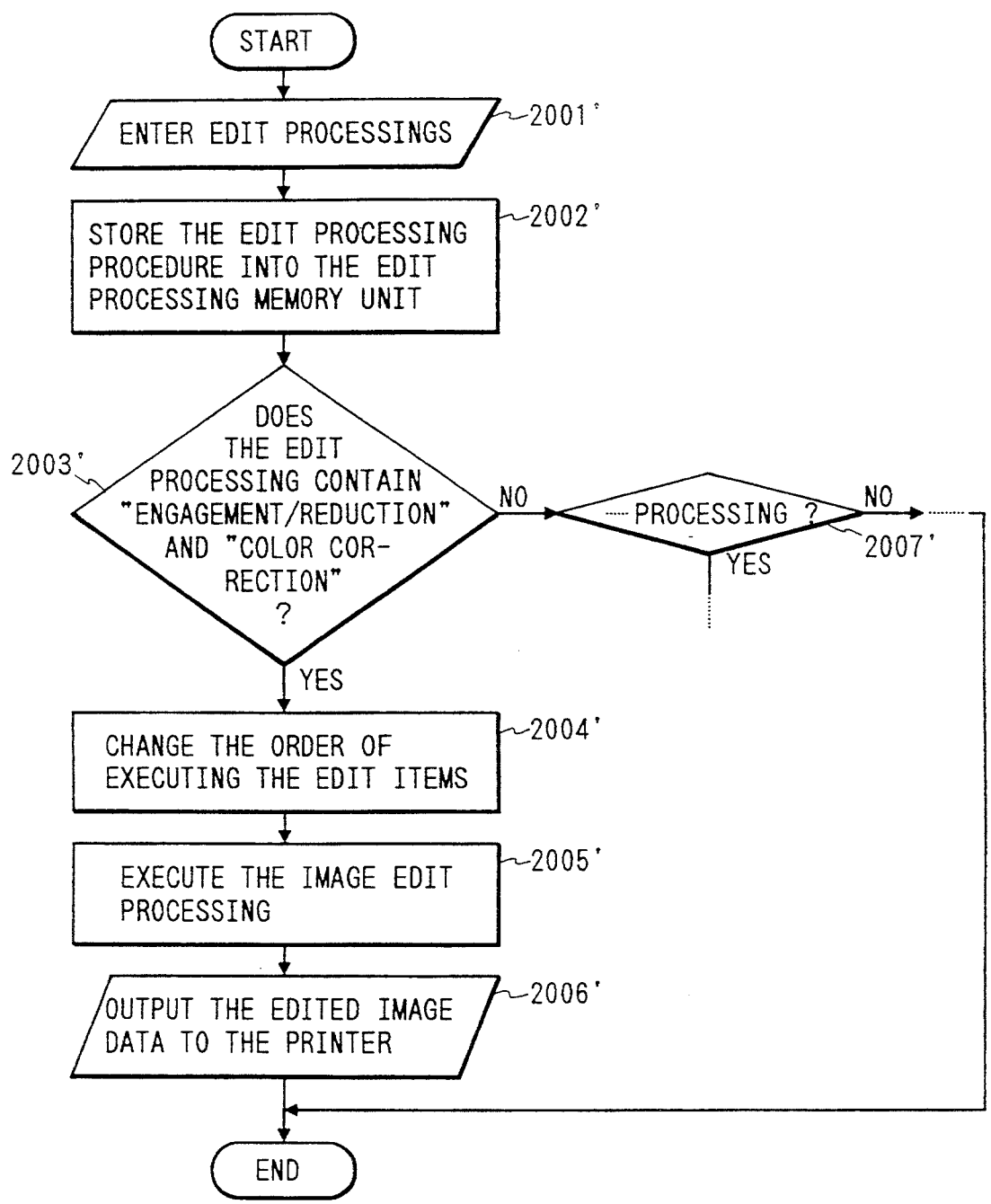

FIG. 19 is a block diagram showing yet another embodiment of an image edit processing apparatus according to the present invention. FIGS. 20(a) and 20(b) are flow charts showing different edit processing operations of the image-edit processing apparatus of FIG. 19.

The image-edit processing apparatus shown in FIG. 19 is substantially the same construction as the apparatus shown in FIG. 1, except the processing to print an image by a printer 17. An edit processing of the image-edit processing apparatus will be described with reference to FIGS. 19 and 20(a).

In a step 2001, an instruction to execute the edit processing is entered from an edit operation input unit 191.

In a step 2002, in response to the instruction from the edit operation input unit, the edit processing procedure is stored into an edit processing memory unit 13. Thereafter, an instruction to execute the edit processing procedure is entered from the edit operation input unit 191 to an image edit processing unit 12. In response to the execution instruction, the image edit processing unit 12 starts to execute the edit processing. At this time, an edit processing altering unit 14 reads the edit processing procedure from the edit processing memory unit 13, and alters it to such an edit processing procedure as to change the result of processing the image data. In a step 2003, the edit processing altering unit 14 investigates whether resemblance edit processings are present or absent. If the resemblance edit processings are absent, it further investigates whether another edit processing is present or absent. If the resemblance edit processings are present, it goes to a step 2004.

In a step 2004, the edit processing altering unit 14 integrates the resemblance processing procedures into a single processing procedure, and stores the single processing procedure into the edit processing memory unit 13.

In a step 2005, the image data of the image memory unit 11 is processed in accordance with the single edit processing procedure, which is stored in the edit processing memory unit 13.

In a step 2006, the image data thus edit processed is output as a picture by the printer 17.

FIG. 20(b) is a flow chart showing another edit processing by the edit processing altering unit 14 as another embodiment of the invention. The edit processing of FIG. 20(a) is different from that of FIG. 20(b) in the processings of steps 2003 and 2004.

The embodiment handles a case where the edit items of "color correction" and "enlargement/reduction" are instructed.

A sequence of processings from a step 2001' to a step 2002' is the same as that in FIG. 20(a).

In a step 2003', the system control checks whether or not the edit processing contains both "color correction" and "enlargement/reduction". When it contains both edit items, the system goes to a step 2004'.

In the step 2004', the edit processing altering unit 14 alters the edit-items processing order, which is stored in the edit processing memory unit 13, that is, the order of the "color correction" and "enlargement/reduction", and stores the altered order into the edit processing memory unit 13.

Steps 2005' and 2006' execute the edit processings as in FIG. 20(b).

As described above, the edit processing altering unit 14 alters the edit processings in two ways. In the first way, a plural number of resemblance processings are integrated into a single processing. For example, a plural number of "enlargement/reduction" processings are integrated into a single "enlargement" processing or a single "reduction" processing. In the second way, the order of executing a plural number of edit items is changed. When the altered edit processing is executed, a complicated edit processing is simplified and the number of pixels of the image data, when it is processed, is reduced.

Figure 21A:
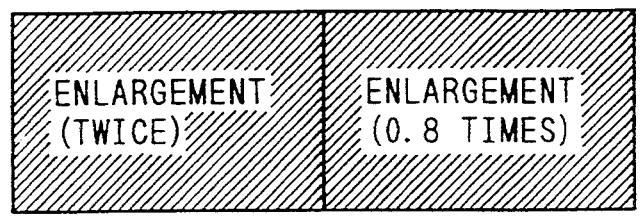
FIGS. 21(a) and 21(b) are each explanatory diagrams comparatively showing processes in which a plural number of resemblance edit processings are integrated into a single edit processing.
Figure 21B:
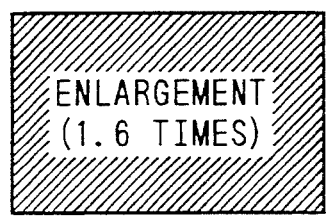

FIG. 21 is an explanatory diagram comparatively showing processes in which a plural number of resemblance edit processings are integrated into a single edit processing.

An example of processing a plural number of resemblance processings is shown in FIG. 21(*a*). In this example, two resemblance edit processings, 200% (2 times) enlargement and 80% (0.8 times) enlargement (reduction), are presented. These two edit processings shown in FIG. 21(*a*) are integrated into a single edit processing by the edit processing altering unit 14 as shown in FIG. 21(*b*).

In the example of FIG. 21(*a*), the conventional technique executes the two processings of the 200% enlargement and the 80% enlargement. Accordingly, the processing time is the sum of the times of processing the two processings.

In the present invention, the two resemblance edit processings are integrated into a single edit processing shown in FIG. 21(*b*) by the edit processing altering unit 14. Thus, a plural number of resemblance edit processings are multiplied into a single edit processing. In other words, the plural number of resemblance edit processings are executed not respectively but are processed through a one-time execution.

Thus, if a plural number of instructions are entered from the edit operation input unit 41, the image edit processing unit 12 carries out only one-time execution. Accordingly, the processing time is reduced.

In the example of FIG. 21(*a*), the conventional technique uses an additional image memory unit to temporarily store the result of the 200% enlargement processing as the first enlargement processing, in order to execute the plural number of processings. On the other hand, in the present invention, since the single enlargement processing is executed one time as shown in FIG. 21(*b*), such a memory unit is not required, leading to reduction of cost to manufacture.

Figure 22A:
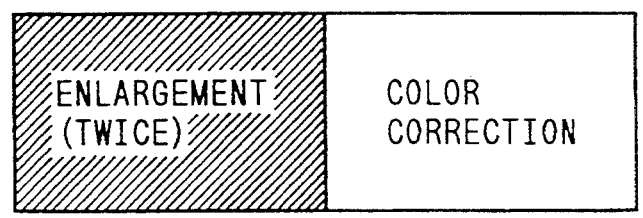
FIGS. 22(a) and 22(b) are explanatory diagrams showing a process in which the order of executing a plural number of edit processings is changed.
Figure 22B:
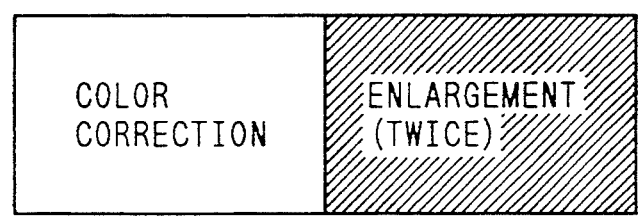

FIG. 22 is an explanatory diagram showing a process in which the order of executing a plural number of edit processings is changed.

FIG. 22(*a*) diagrammatically shows an edit processing in which an enlargement processing is executed before a color correction processing. FIG. 22(*b*) diagrammatically shows an edit processing in which an enlargement processing follows a color correction processing in their execution.

In the edit processing of FIG. 22(*a*) where the color correction follows the 200% enlargement, the number of pixels to be color corrected is four times. Accordingly, the time taken for the color correction is also increased four times. In the present invention, the order of executing the edit processing is changed such that the enlargement processing is executed after the color correction processing as shown in FIG. 22(*b*). Therefore, the number of pixels to be color corrected remains unchanged, that is, it is equal to that of the original image data. In other words, the number of color-corrected pixels is reduced to $\frac{1}{4}$ times as large as that in the edit processing of FIG. 22(*a*). The time to execute the edit processing is reduced.

The processing to alter the contents of the image edit processing is simpler than the operation to process an actual image. Accordingly, the image-edit processing apparatus of the invention is low in cost and high in processing speed.

Figure 23:
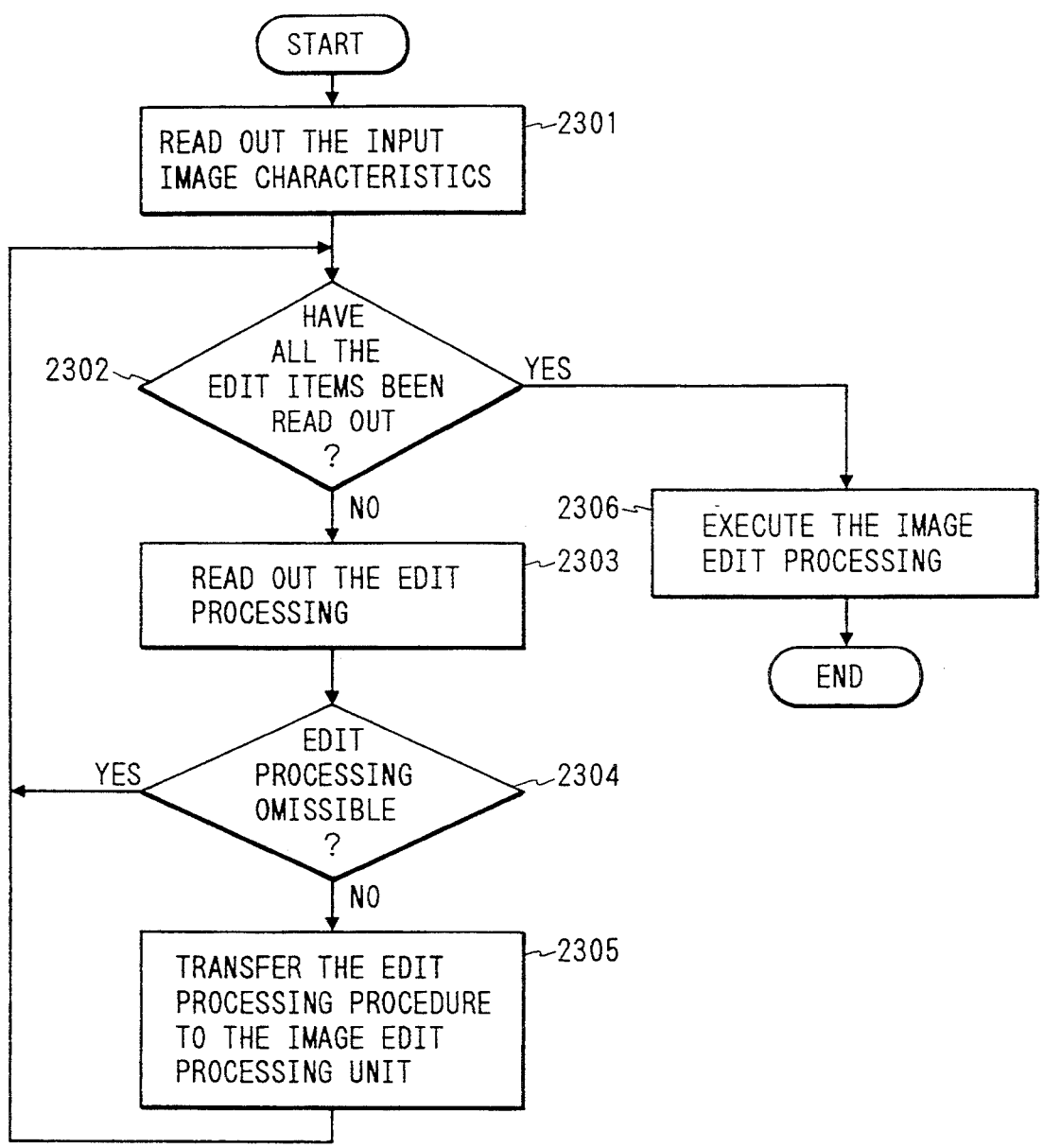
FIG. 23 is a Flow chart showing a flow of the processing operation of an image-edit processing apparatus according to a further embodiment of the present invention.

FIG. 23 is a flow chart showing a flow of the processing operation of an image-edit processing apparatus according to a further embodiment of the present invention.

An edit processing operation of the image-edit processing apparatus will be described with reference to FIG. 23.

In a step 2301, the edit processing memory unit 13 reads the characteristics of image data, such as resolution, color space, tone, and constituent elements, from the image memory unit.

In a step 2302, the system control checks whether or not all of the edit items instructed from a keyboard, not shown, have read. If the edit items have all been read out, the system goes to a step 2306. If not, it goes to a step 2303.

In a step 2303, the edit processing altering unit 14 reads one edit item from the edit processing memory unit 13.

In a step 2304, the system control investigates the image data characteristics read out in the step 2301 and the edit item read out in the step 2303, and checks whether or not the edit item is omissible. If it is omissible, the system returns to the step 2302. If it cannot be omitted since omission of it will present different edit results, the system goes to a step 2306.

When the edit item read out in the step 2303 is a "binarizing" processing, and the color space of the input image is a "monochrome", the "binarizing" processing is omissible since there is no need of executing such a processing. If the color space of the input image is "RGB", the processing of RGB-B/W conversion is executed.

In a step 2305, the edit processing read out in the step 2303 is altered into the edit processing obtained in the step 2304, and the result is sent to the image edit processing unit 12. Then, the system returns to the step 2302 for reading out the next edit item.

In a step 2306, the edit processing is executed since all of the edit items have been read out in the step 2302, and the edit processings altered so as to be suitable for the edit items have been sent to the image edit processing unit 12.

As described above, for the same instructed edit items, the edit processing is properly and efficiently executed in accordance with the input image characteristics and the edit processing contents. Such a redundant processing that the binary image is processed again for binarizing can be avoided.

As seen from the foregoing description, according to the present invention, the edit processing can be properly and efficiently executed in accordance with the characteristics of the input image and the output device, with mere provision of the edit processing altering unit. For example, the edit processing can be executed at such a resolution as to match to that of an output device having a resolution lower than that of the input image.

Accordingly, the processing speed of the image-edit processing apparatus is remarkably increased.

Further, if an operator enters a plural number of edit processing instructions, the edit processing can be efficiently executed in the apparatus, since the edit processing altering unit of the apparatus automatically integrates the plural number of the processing instructions into a single edit processing or change the order of executing the entered edit processings, with the intention of gaining the most efficient edit processing.

What is claimed is:

1. An image-edit processing apparatus comprising:

input means for reading an image and generating first image data representing the image;

image memory means for storing first image data;

edit processing memory means for storing first procedure data representing procedures for editing the first image data stored in said image memory means, said procedures being provided for respective editing types and each comprising at least one procedure component;

edit processing means for processing the first image data to generate a second image data based on the first procedure data corresponding to at least one editing type requested by an operator;

edit processing altering means, when characteristics of at least one of the first image data and second image data meet at least one predetermined condition for altering the first procedure data to a second procedure data based on said at least one predetermined condition in order to add, delete, change, or replace the at least one procedure component;

said edit processing means, when the characteristics of at least one of the first image data and second image data meet said at least one predetermined condition, for processing the first image data to generate the second image data based on the second procedure data, the second image data generated based on the second procedure data being the same as the second image data generated based on the first procedure data when said at least one predetermined condition is meet; and output means for outputting the second image data.

2. The image-edit processing apparatus according to claim 1 wherein said edit processing memory means receives characteristics data of resolution, tone, color space, and constituent elements of at least one of the first image data and the second image data, and said edit processing altering means alters edit processing procedure according to the image characteristics data stored in said edit processing memory means.

3. The image-edit processing apparatus according to claim 2 wherein said edit processing altering means contains the correspondence of the effective processing procedures and the characteristics of the image, and said edit processing altering means alters the edit processing procedure according to the image characteristic data while referring to the correspondence.

4. The image-edit processing apparatus according to claim 1 wherein said image memory means distinctively stores image constituent elements such as characters, graphics, and raster, and said edit processing altering means alters the processing procedure of said image constituent elements according to the attributes of said image constituent elements.

5. The image-edit processing apparatus according to claim 1 wherein said edit processing memory means receives characteristic data of an intended output device, such as resolution, tone, color space, and processing speed, and said edit processing altering means alters the edit processing procedure, which is stored in said edit processing memory means, according to the characteristics of said output device.

6. The image-edit processing apparatus according to claim 5 wherein said edit processing memory means receives a magnification instruction for enlarging/reducing the image and resolution of said output device, and said edit processing altering means alters a magnification percentage according to the resolution of the output device.

7. The image-edit processing apparatus according to claim 1 wherein said edit processing memory means receives the performances of a CPU for executing edit processings and the performances of an intended output device, said edit processing altering means selects a processing speed and an object to optimize the processing procedure, such as output picture quality according to the performances of the CPU and the output device, and said edit processing altering means alters the edit processing procedure so as to achieve the optimizing object.

8. The image-edit processing apparatus according to claim 1 wherein said edit processing memory means receives instructions to process the image, and stores the order of inputting instructions, and said edit processing altering means alters the types of the image processing instructions, that is stored in said edit processing memory means, and the order of said instructions.

9. The image-edit processing apparatus according to claim 1 wherein said edit processing memory means receives instructions to process the image, and stores the order of inputting instructions, and when an instruction of those stored in said edit processing memory means is of the replaceable type, said edit processing memory means replaces the place of the instruction in the entering order with another.

10. The image-edit processing apparatus according to claim 1 wherein said edit processing memory means receives instructions to process the image, and stores the order of inputting instructions, and said edit processing altering means contains the correspondence of the types and the entering order of the image processing instructions stored in said edit processing memory means and the cost of executing said instructions, and when the entering order may be altered and the cost reduction would be advantageous when it is altered, said edit processing altering means alters the entering order by referring to the correspondence.

11. The image-edit processing apparatus according to claim 10 wherein said edit processing memory means receives instructions to process the image, and stores the order of inputting instructions, and when the type and the entering order of the image processing instructions stored in said edit processing memory means allow the instruction entering order to be altered, and the altering of the entering order would be advantageous in the light of the amount of the memory used, said edit processing altering means alters the entering order.

12. The image-edit processing apparatus according to claim 10 wherein said edit processing memory means receives instructions to process the image, and stores the order of inputting instructions, and when the type and the entering order of the image processing instructions stored in said edit processing memory means allow the instruction entering order to be altered, and the altering of the entering order would be advantageous in the light of the image quality, said edit processing altering means alters the entering order.

13. The image-edit processing apparatus according to claim 10 wherein said edit processing memory means receives instructions to process the image data, and stores the order of inputting instructions, and when the type and the entering order of the image processing instructions stored in said edit processing memory means allow the instruction entering order to be altered, and the altering of the entering order would be advantageous in the light of the processing speed, said edit processing altering means altering the entering order.

14. The image-edit processing apparatus according to claim 10 wherein said edit processing memory means receives instructions to process the image, and when a plural number of resemblance image processing instructions, which may be integrated, are stored in said edit processing memory means, said edit processing altering means integrates those image processing instructions into a single image processing instruction.

15. The image-edit processing apparatus according to claim 10 wherein said edit processing memory means receives instructions to process the image, and when a plural number of magnification instructions are stored in said edit processing memory means, said edit processing altering means integrates the magnification instructions into a single magnification instruction.

16. The image-edit processing apparatus according to claim 1 wherein said edit processing memory means receives characteristic data of resolution, tone, color space, and constituent elements to output instructions for processing the image, and when the processing result remains unchanged if the image processing instructions stored in said edit processing memory means are not executed, said edit processing altering means is inhibited from executing said instructions.

* * * * *

UNITED STATES PATENT AND TRADEMARK OFFICE
CERTIFICATE OF CORRECTION

PATENT NO. : 5,436,734
DATED : July 25, 1995
INVENTOR(S) : Tomonari YAMAUCHI et al It is certified that error appears in the above-indentified patent and that said Letters Patent is hereby corrected as shown below:

CLAIM 1, COLUMN 23, LINE 42, "meet" SHOULD READ --met--.

Signed and Sealed this

Twenty-third Day of July, 1996

Attest:

BRUCE LEHMAN

Attesting Officer

Commissioner of Patents and Trademarks